(12) United States Patent
Faria

(10) Patent No.: US 7,457,515 B1
(45) Date of Patent: Nov. 25, 2008

(54) DIGITAL DATA DISTRIBUTION SYSTEM

(75) Inventor: Richard Faria, London (GB)

(73) Assignee: Cerberus Central Limited, London (GB)

( * ) Notice: Subject to any disclaimer, the term of this patent is extended or adjusted under 35 U.S.C. 154(b) by 362 days.

(21) Appl. No.: 10/130,583

(22) PCT Filed: Nov. 20, 2000

(86) PCT No.: PCT/GB00/04406

§ 371 (c)(1),
(2), (4) Date: Aug. 19, 2002

(87) PCT Pub. No.: WO01/37275

PCT Pub. Date: May 25, 2001

(30) Foreign Application Priority Data

| Nov. 19, 1999 | (GB) | ................................ | 9927494.6 |
| Feb. 3, 2000 | (GB) | ................................ | 0002542.9 |
| Mar. 1, 2000 | (GB) | ................................ | 0005014.6 |
| May 8, 2000 | (GB) | ................................ | 0011116.1 |

(51) Int. Cl.
*H04N 5/91* (2006.01)
(52) U.S. Cl. .......................... 386/52; 386/96; 386/112; 386/125
(58) Field of Classification Search .................. 386/46, 386/94, 95, 96, 125, 126, 52, 83
See application file for complete search history.

(56) References Cited

U.S. PATENT DOCUMENTS

| 4,963,995 | A | * | 10/1990 | Lang | ........................... | 386/54 |
| 5,617,384 | A | * | 4/1997 | Yonemitsu et al. | ....... | 369/30.04 |
| 5,623,470 | A | | 4/1997 | Asthana et al. | | |
| 5,633,839 | A | | 5/1997 | Alexander et al. | | |
| 5,949,688 | A | * | 9/1999 | Montoya et al. | ............ | 700/235 |
| 6,018,612 | A | * | 1/2000 | Thomason et al. | ............ | 386/82 |
| 6,304,714 | B1 | * | 10/2001 | Krause et al. | ................. | 386/52 |
| 6,317,779 | B1 | * | 11/2001 | Gile et al. | .................... | 709/217 |
| 6,678,462 | B1 | * | 1/2004 | Chihara | ....................... | 386/83 |
| 6,700,989 | B1 | * | 3/2004 | Itoh et al. | .................... | 382/100 |

FOREIGN PATENT DOCUMENTS

| DE | 198 33 813 A1 | 4/1999 |
| EP | 0 730 274 A2 | 9/1996 |

OTHER PUBLICATIONS

Plumer, Charles; Packet Written CDR; http://sanyolaserproducts.com/news/bulletins/packet_written_cdr.htm; Jan. 1998; 1 page; Sanyo Laser Products; Richmond.

* cited by examiner

*Primary Examiner*—Huy T Nguyen
(74) *Attorney, Agent, or Firm*—Dinsmore & Shohl LLP

(57) ABSTRACT

A method of and apparatus for recording selected AV (Audio/Video) data from a first data store (106) to an AVDDM (Audio/Video Distributable Data Medium) (102) is described. The method comprises reading a portion (104, 112, 122) of the selected AV data from the first store (106); and transferring (108, 120) the read portion (104, 112, 122) to an AVDDM recorder (70) via a second store (114) in which the read portion (104, 112, 122) has been temporarily stored. The read portion (104, 112, 122) is then recorded (110) onto the AVDDM (e.g. a CD) (102). These processing steps are repeated until all the portions of the selected AV data have been recorded onto the AVDDM (70) and at least the reading, and recording steps are carried out simultaneously for different portions of the selected AV data. The apparatus can also be used as part of a compiling apparatus which is linked to a remote database preferably via a satellite link (28) and comprises a user-friendly simple GUI (Graphical User Interface).

21 Claims, 23 Drawing Sheets

DIGITAL DATA DISTRIBUTION SYSTEM

The present invention concerns improvements relating to digital data distribution and more particularly, though not exclusively, to a method of and apparatus for recording selected Audio/Video (AV) data onto an Audio/Video Distributable Data Medium (AVDDM) such as a Compact Disc (CD). The method is employed as part of a data composing apparatus in which AV data can be selected by the consumer using a Graphical User Interface (GUI) and retrieved from databases of stored AV data. The data composing apparatus is part of a digital distribution system in which data collected from the Internet is stored in a central database and can be accessed from remote sites using Artificial Intelligence (AI).

The recording of Audio/Video AV data onto Audio, Video and Data Distributable Media (AVDDM) is an essential part of various entertainment and hi-tech industries, such as film distribution, music/songs distribution and even software products (games) distribution. The recording process has traditionally taken place centrally where the manufacturer has a master copy of the AV data that is then used to create multiple copies on AVDDM for distribution. Powerful computers have been used together with software packages that are capable of recording the AV data onto AVDDM in the various required formats.

Types of AV data that are distributed in this way include digital movies, computer games, digitally recorded programs, videos, and music/songs. AV data is characterised by often having data files of large size that cannot be compressed without degradation of quality. Examples of AVDDM are CDs, Digital Audio Tapes (DATs), Digital Video Discs (DVDs), etc. All of these are digital data storage media are designed to be portable and distributable.

Referring to FIG. 1, a typical prior art recording process which is carried out centrally is shown. The original AVDDM 1 (or master copy) is simply copied onto a blank AVDDM by use of an AVDDM recorder 2. Copying the original data onto the blank AVDDM creates a clone AVDDM 3 for distribution. This process is repeated usually in parallel to create the required number of copies within a given commercial time span.

In view of the fact that the data is digitised, an alternative process of recording AV data onto AVDDM has been developed which is now described in FIG. 2. The process involves taking AV data from a store of AV data files 4, such as a database of AV data files provided on a hard drive of a computer, and writing a digital image 5 of the desired AVDDM into a temporary data storage device. Once the digital image 5 has been created, the alternative process proceeds as in the original process described in FIG. 1, namely the AVDDM image 5 is recorded onto a blank AVDDM using an AVDDM recorder 6 thereby creating an AVDDM clone 7 of the AVDDM image 5.

The advantage of the alternative process over the original cloning process is that the manufacturer can create a desired compilation of AV data from the database of AV data files. This is achieved by simply constructing the AVDDM image using a selecting procedure in which the required digital data is compiled. This selection process has not in the past been optimised because it is carried out only once for each manufacturing run of a particular AVDDM.

In the industries using the above described known processes, pre-recorded media has been the major AVDDM supplied to the customer (user) with there being no opportunity for customer selection of the specific composition of the AV data. However, due to recent advances in technology, there have been changes in this established method of AV data compilation creation and distribution.

Recently, there has been a trend towards purchasing AVDDM over the Internet. Several web sites have been set up which present catalogues of pre-recorded AV data compilations such as music albums. Examples of these web sites are cdnow.com and buy.com. At these web sites, the customer searches through lists of AV data records and selects the desired pre-recorded collection for recordal on an AVDDM. The AVDDM is recorded and then shipped to the customer by post. The selection process is time consuming for the customer as the catalogues of AV data records are presented over several web pages and in lists which need to be scrolled through in order to find a desired artist's album for example.

Some of these web sites have been recently adapted to enable customers to create their own CD compilations. Examples of such AV customer selection sites are musicmaker.com, musicmatch.com and customdisc.com. The selected compilations are usually recorded at the manufacturer's site and posted to the customer. However, in some cases, the selected AV data can be downloaded directly to the customer. The downloaded AV data is often limited to relatively small AV files such as a single audio track from a predetermined set of AV data files. For larger AV data files, such as digital movies, it is simply not cost effective to transfer the data over the Internet due to the slow data transfer rates.

Downloaded AV data is usually not recorded onto an AVDDM but rather is stored on the customer's hard drive or is recorded from the customer's PC onto a portable media player such as an MP-3 audio player for example.

In order to select the desired compilation of AV data, it is necessary to access several web pages at a given web site and to also search through lists of artist's data. This process suffers from the same problems as the above-described original and alternative methods.

It is also possible to have the entire AV data selection and AVDDM recording process carried out locally without use of the Internet. For example U.S. Pat. No. 5,633,839 describes a CD vending system for recording customer's musical selections onto a CD. The vending system has a complicated GUI that enables the user to select specific songs by use of the song's unique code. Data is only available from a removable hard drive, which can only store a limited amount of AV data.

The present invention aims to overcome at least some of the above-described problems.

The present invention is based on the realisation that it is not necessary to create a full digital image of the final AVDDM to be recorded in the AVDDM recording process. Rather, massive benefits can be obtained by dividing the selected data into portions that are processed sequentially, simultaneously and asynchronously in the recording of the AVDDM.

According to one aspect of the present invention, there is provided a method of recording selected AV (Audio/Video) data from a first data store to an AVDDM (Audio/Video Distributable Data Medium), the method comprising: storing temporarily a portion of the selected AV data that has been read from the first store, into a second store; transferring the read portion from the second store to an AVDDM recorder; recording the read portion onto the AVDDM (e.g. a CD); and repeating the above processing steps until all the portions of the selected AV data have been recorded onto the AVDDM; wherein at least the storing and recording steps are carried out simultaneously for different portions of the selected AV data.

The above method is implemented in the present embodiments as an algorithm and is referred to herein after as the Data Spray algorithm. The Data Spray algorithm has several advantages over previously known AVDDM recording methods and some of these are listed below.

The Data Spray algorithm substantially reduces the time necessary to record an AVDDM because it does not create a full-size digital image of the AVDDM. Thus the Data Spray algorithm enables AVDDM to be recorded at very high speed and is of particular importance when the compilation that is to be recorded on each produced AVDDM is unique or when there are time constraints on the time allocated to record each AVDDM.

The alternative prior art process illustrated in FIG. 2 requires the full-size image to be formed prior to commencing the recording of the AVDDM. Sequentially processing AV data in this conventional way means that the operation of the process is not optimised. With the advent of larger sized AV data files and increased AVDDM capacity, this delay has become larger and very significant to the effective operation of the recording method.

The Data Spray algorithm reduces the amount of memory required to record an AVDDM, as it does not create a full-size digital image of the AVDDM. In contrast to the majority of prior art systems, the size of the temporary memory or second store does not depend on the size of the AVDDM or the amount of data that is to be recorded. In fact, it can be relatively small in comparison to the size of the AVDDM because of the use of multiple recording cycles of portions of the selected AV data. Whilst this memory size requirement may not appear to be that onerous for the prior art processes where one AVDDM recorder is used, when a plurality of AVDDM recorders are provided to access the same stored AV data files, as in a commercial system, then the size of the required memory can increase to a large size which would be prohibitively expensive to implement.

One key advantage over the prior art processes, is that in the present invention, the size of the required second store (temporary memory) need not increase significantly in order to operate a plurality of AVDDM recorders concurrently. The benefits of the present invention, in respect of required temporary memory size, increase as the number of AVDDM to be recorded simultaneously increases.

Another key advantage of the present invention is realised when a plurality of AVDDM recorders are used in the method. Each AVDDM recorder, being a mechanical device, can generate a different recording time for each segment of AV data to be recorded. Accordingly, in the use of a plurality of AVDDM recorders concurrently, different data transferring patterns are generated which are each independently accommodated by the second store. Therefore, the overall speed of the process of multiple recordings is increased and is not limited to the slowest AVDDM's speed of transfer as in the prior art systems.

The method may further comprise generating a feedback signal when the AVDDM recorder has finished recording the read portion; and wherein, for each portion of the selected AV data, the processing steps are carried out asynchronously on the basis of the feedback signal. The feedback signal acts as a clock in that all the other processing steps are timed in relation to the status of the feedback signal. This enables the process to operate asynchronously, allowing processing steps to be carried out in parallel, and so optimising the overall performance of the method.

Preferably, the transferring step is also carried out simultaneously with the storing and recording steps for different portions of the selected AV data. The transferring step operates on a different portion of the AV data and so it can be carried concurrently to improve throughput.

The storing step is preferably carried out sequentially within the time taken to complete the recording step. As the recording step takes a relatively long time to complete, there is enough time to implement the reading of the AV data portion and the storing step on the same data before the next portion is to be recorded. Hence the number of steps carried out in parallel increases thereby increasing the efficiency and speed of the method.

The method preferably further comprises selecting AV data to be recorded from the first data store. This selecting step advantageously enables a user of the method to create a desired compilation of AV data for recordal.

The AV data may be in a format unsuitable for recording onto the AVDDM and the method then may further comprise converting the read portion of the selected AV data into an AVDDM format. This advantageously enables the method to access databases storing the required AV data in any format, which in turn leads to a greater number of different databases (and hence AV data records) that can be accessed by the method.

When the AV data is encoded, the method may further comprise the step of decoding the read portion of the selected AV data. As databases of AV data often encode the data for security purposes, the method can access this encoded AV data by use of suitable decoding algorithms. Furthermore, the ability to decode encoded AV data also advantageously increases the number of AV databases which can be accessed by the method.

The method may further comprise processing the read portion of the AV data prior to temporarily storing it. The ability to process a portion of the read AV data means that additional security measures can be employed in the recording process which are far harder to implement in conventional AVDDM recording processes.

In particular, the processing step may comprise applying a digital copyright notice into the AV data to be recorded. Also the processing step may comprise adding a digital data watermark to the AV data to indicate the authenticity of the recorded copy. Both of these steps provide additional security against fraud. The marking of digital copies in these ways may be required by the company owning the original data and may even be a pre-requisite to licensing access to the owner's database. In the conventional recording processes, adding such copyright notices and digital data watermarks is difficult because the process is implemented on the entire selection of AV data rather than portions of it.

The method may also include checking the format of the AVDDM once it has been recorded with the selected AV data. This step provides a final check to confirm that the process has been successful which enables quality control of the method to be effected.

Advantageously, the method may also include the step of recording a table of contents onto the AVDDM once it has been recorded with the selected AV data. The table of contents provides a digital summary of the customer's (user's) selection which can be processed as appropriate by the AVDDM reading device which will ultimately play the AV data. Preferably, the table of contents is placed in a single continuous string and printed onto the AVDDM. When the AVDDM is a disc shape such as a DVD or CD, the string is in the form of a spiral. This advantageously provides a logical way of reading the data which does not get shortened or truncated due to limited printing areas available as a result of segmentation of the AVDDM surface into a plurality of sections.

The method is preferably operable under the control of a host operating system. This allows the method to operate and access databases not provided locally and to control other devices which may be required to implement the method commercially such as a CD cover printer. The Data Spray algorithm advantageously operates on any of the known software operating systems and can be controlled and interfaced with any database system or another program.

The Data Spray algorithm communicates with its host operating system to ensure that enough processing power is available for Data Spray to operate correctly. If, for any reason, the host operating system needs to carry out a task that would jeopardize part of the Data Spray algorithm's recording process, the Data Spray algorithm can be configured to override the host operating system until the recording process is complete.

The present invention also extends to an apparatus for transferring AV (Audio/Video) data selected from a first store to an AVDDM (Audio/Video Distributable Data Medium), the apparatus comprising: first transfer means for reading a portion of the selected AV data from the first store and temporarily storing the same in a second store; second transfer means for transferring the read portion from the second store to the AVDDM recorder; and an AVDDM recorder for recording the read portion onto the AVDDM (e.g. a CD); wherein the apparatus is arranged to repeatedly transfer portions of the selected AV data until all of the selected AV data has been recorded onto the AVDDM and to operate the first transfer means and the AVDDM recorder simultaneously on different portions of the selected AV data.

According to another aspect of the present invention, there is provided a method of printing index information onto a disk shaped AVDDM, the method comprising: obtaining a list of data relating to the contents of the AVDDM; and controlling a movable printing head device to print out the list of information on the surface of the AVDDM, wherein the movable printing head device is controlled in such a manner as to enable the printing of the list of information as an elongate string of characters in the form of a spiral on the AVDDM surface.

The advantages of this novel method of printing have already been described above. In addition, the controlling step may comprise controlling the printing head device to print the list of information along a reducing radius spiral. In other words, the spiral is commenced from the outer edges of the disk and moved radially inwardly towards a centre of the disk. The advantage of this is that it minimises the curvature for the printed text in most cases as the length of the string will be shorter that the printable capacity of the disk.

The difficulty with current AV data distribution system GUI's is that in themselves they fail to attract the attention of the user because they are usually listing devices of text titles for huge amounts of AV data together with a text-based search engine. Further these GUI's fail to hold the attention of a users for a significant period of time as they make the use of the GUI boring. Attention time is clearly beneficial as the longer a user is browsing an AV database, the greater the chance there is of them not leaving without finding something they want or even purchasing greater amounts of AV records. Furthermore, by making the GUI interesting to use, there is a greater chance of the user returning.

The present inventor has realised these subjective but important issues and has created a novel GUI for use in the selection of AV data from a database of records for recordal on an AV data distribution device.

More specifically, according to another aspect of the present invention, there is provided a GUI (graphical user interface) for rapidly accessing and selecting AV (audio/video) data records stored in an AV database, the GUI being arranged to compile and display a selection of the AV records for recordal on an AVDDM (Audio Visual Digital Data Media) and comprising: a first array of displayed graphical images, each being linked to a specific action and representing an AV data record or a set of AV data records stored in the AV database; and a cursor movable by the user for highlighting a currently selectable image, wherein the GUI has three-dimensional attributes in that it is arranged to enable relative movement between the cursor and the displayed graphical images in two dimensions (X and Y co-ordinates) and variation in a perceived viewing distance (Z co-ordinate) of at least some of the displayed graphical images.

The three-dimensional aspect of the present invention is not only beneficial for keeping the user interested in the browsing process, but also provides the ability for each graphical image being displayed on the screen to be reduced in size because the Z co-ordinate feature enables the user to zoom into the graphical image for greater detail if required. By minimising the size of each graphical image representing an AV record, a greater number of images can be displayed on the screen at any time thereby maximising the number of options presented to the user.

In addition, if a video file is associated with the graphical image, by being able to vary its viewing distance (Z co-ordinate), it is possible to maximise the visual area provided for displaying the video data when the graphical image is selected thereby providing efficient use of the screen viewing area. In this way, the requirement of the GUI to be able to present significant amounts of selectable AV data records is met as well as advantageously providing the ability to provide more detailed information regarding a selected record, for example.

The use of three-dimensional movement within a GUI has been implemented for some time in the field of games software, this is in fact essential to each three-dimensional interactive game. However, the present inventor has appreciated that there are significant benefits (described above) of using the three-dimensional nature of a games GUI within a graphical image based GUI which compiles and displays a list of AV data to be recorded on an AVDDM.

The GUI may be arranged to vary the perceived viewing distance of a displayed graphical image upon its selection by use of the cursor. The selection of a graphical image indicates the user's interest in the AV record associated therewith. Accordingly, efficient use of the display screen is made by zooming into or out of the graphical image by the selection.

The GUI may be further arranged to change the perceived viewing distance to a displayed graphical image on its selection, to move the selected graphical image in at least one of the X and Y co-ordinates to a new viewing location; and again to change the perceived viewing distance to the selected graphical image at the new viewing location. When the changes are complementary, this is akin to lifting or dropping the graphical image from the plane of the other graphical images, moving it to a new location (usually a selection list), and then dropping or lifting the graphical image into the plane of the other graphical images at the new location. When the selected graphical image appears to be lifted from the plane of images, its movement to the new location gives the appearance of it being floated across the other graphics that make up the available selection choices for the user. This movement for graphical image selection is particularly attractive to users and advantageously increases attention time at the GUI. Furthermore, it is possible at this stage simultaneously to change the size of the graphical image to fit another array at he new location.

The GUI may also be arranged to reduce the perceived viewing distance to a displayed graphical image on its selection, and to play an audio or video file associated with the displayed graphical image. This is useful when the AV files are music files where an sample of an audio track can be played on selection together with the corresponding sample video associated with that audio track. In this way users can see what they are purchasing and this is also an aid to completing a sale of the AV record. Furthermore, this additional option provides a further feature to maintain the browsing user's interest.

As mentioned earlier, most of the prior-art GUIs for accessing and selecting stored AV data records in a hierarchical AV database use several web pages and numerous lists of artists' names. The problem with these arrangements is that it can take a long time to access a desired AV data record. Accordingly the provision of multiple arrays of graphical images with each array representing a different level in the hierarchical AV database is a solution to this problem which acts as a real-time data filter only providing the customer with the relevant information on a single screen.

More specifically the AV database may comprise a hierarchical AV database, and the GUI may comprise: a second array of displayed graphical images, each displayed graphical image of the second array being linked to a specific action and representing an AV data record or a set of AV data records stored in the hierarchical AV database; wherein both arrays are displayed simultaneously and graphical images displayed in the second array represent the contents of a cursor-highlighted currently selectable graphical image in the first array thereby providing the user with relevant information from different levels of the hierarchical AV database at the same time.

This GUI is particularly useful for browsing the database as the customer is able not only to see options available for selection at the present level of the database but also what choice the selection of a particular option will lead to. The speed at which users can browser the database is also increased by the use of images rather than just text representing the available choices. Furthermore, the combination of a three-dimensional GUI and a representation of multiple levels of a hierarchical database on a single screen, namely simultaneously, is highly advantageous and provides a synergistic effect for the user which the inventor considers is optimal for increasing human interaction and interest in the GUI.

Preferably, the GUI is arranged to cause information presented in the second array to be updated automatically to provide the relevant data selection to the user on relative movement of the cursor within the first array. The automatic nature of the updating also enables customer browsing speed of the AV data stored on the database to be increased.

Advantageously, the GUI may further comprise a third array of displayed images, each displayed image being linked to a specific action and representing an AV data record, wherein the third array is displayed simultaneously with the first and second arrays and images displayed in the third array represent the contents of a currently selectable image in the second array. An extra hierarchical level of the database can thus be seen by the user thereby allowing complex hierarchies of the AV data grouping to be presented to the user in a simple form.

The GUI preferably further comprises a results array for displaying images representing a list of user selected AV data records from the first array, the results array being displayed simultaneously with the first array. Providing a graphical representation of a customer's current selection provides continuous feedback to the user about what has been selected. This is an invaluable feature for an effective GUI. Also in order to maximise the number of images which can be displayed in the GUI, it is possible to have the results array dimensioned to store smaller representations of the selected records than in the first or second arrays. In this case, the three-dimensional movement of each selected graphical image described above, may also include effective resizing (reduction in size) of the graphical image to fit the size of the results array.

The GUI may further comprise an input device comprising a plurality of arcade-game push buttons for moving the cursor, and for selecting special functions of the GUI. Rather than use a pointing device such as a mouse, or a QWERTY keyboard, providing a set of push buttons dedicated to the specific functions of the GUI advantageously makes the GUI easier to operate.

The first array of the GUI may comprise a group image and the GUI may be arranged such that selection of the group image adds a collection of AV data records into the list of user selected AV data records. This provides a short cut for the customer which enables them to select several AV data records for recordal by way of a single selection.

Preferably, the GUI is arranged to play an audio file associated with a displayed image on selection of that displayed image by the user. However, the GUI may be arranged, alternatively or in addition, to play a video file associated with a displayed image on selection of that displayed image by the user. The audio and/or video file may comprise an instruction file which provides the user with instructions on how to use the GUI. These functions simply allow the user to sample the selected AV record before adding to the list of AV data to be recorded.

In an embodiment of the present invention, the GUI is arranged to move the cursor relative to the first array by maintaining the cursor in a stationary position and moving the first array under user control. Also in this embodiment, the GUI is arranged to move the cursor relative to the second array by maintaining the second array in a stationary position and moving the cursor under user control. Using different ways of cursor movement in the different arrays strengthens the differentiation between the arrays representing the different hierarchical levels of the AV database.

It is also possible for the first array to comprise a search image and the GUI to be arranged such that selection of the search image enables the user to search for a specific record within the database of AV data records. The provision of a search function is useful in that if the user knows exactly what they are looking for, the time taken to compile the desired contents of an AVDDM would be minimised.

The prior art apparatus described in U.S. Pat. No. 5,633, 839 is limited by the number of AV data records that are available to a user. This fact alone can present serious commercial problems in that users often seek AV data records which are simply not available in the database of the apparatus. Also, such prior art apparatus require frequent updating of the AV database which can become expensive. The present invention has another aspect to it that overcomes or at least significantly reduces the above described problem.

According to another aspect of the present invention, there is provided a system comprising an AV (audio/video) data composing apparatus comprising a local database storing AV data, and a remote server comprising a remote database storing AV data, wherein the AV data composing apparatus is arranged to generate and transmit a search request for remote data if any records of a desired compilation of AV data records are not present in the local database, and wherein the remote server is arranged to respond to the search request to retrieve and transmit the required AV data from the remote database to the AV data composing apparatus, and further comprises: an interpreter incorporating artificial intelligence for considering search terms of the search request for AV data stored in the remote database, the interpreter being arranged to generate alternative search terms that are equivalent to those used in the search request, that correct assumed errors in the search terms of the request, or that have an equivalent meaning to the search terms of the request, and to use the alternative search terms to retrieve AV data from the remote database.

The use of artificial intelligence is very important in that it enables the correct AV record to be retrieved in a single access attempt. It is not important that several other AV records, which are perhaps not relevant to the desired search results, may also be retrieved at the same time because they can be rejected instantaneously by the user as being irrelevant. The key factor is minimising time as in some cases the user can be waiting for the AV record from the time when the request is made to when the desired AV record is received at the local site. The use of AI makes this remote AV data record retrieval possible in real time with the knowledge that it is highly likely that the desired AV record has been retrieved even if the search request made by the user was inaccurate. Increasing the user error tolerance also makes the selection and retrieval system more easier to utilise.

Also, a complete digital data distribution system can be realised which provides all the advantages stated previously such as automatic easier updating of databases due to greater centralization, reduced size local databases and lower costs.

The AV data composing apparatus and the remote server may be arranged to communicate with each other via a satellite communications network. Such communication is fast and has a large enough data bandwidth to enable the AV data transfers to be effected apparently seamlessly, as though the AV data was being obtained from the local AV database.

The remote server advantageously comprises an Internet Agent arranged to monitor relevant web sites on the Internet, to collect and store relevant data in the remote database and to carry out these procedures automatically. These features enables the remote database to become self updating and always up-to-date. As the procedure is automatic, the otherwise significant costs of up-dating are minimised.

The Internet Agent is preferably arranged to create Internet links and web site pages and to register these on a plurality of Internet Search Engines automatically. This feature helps to keep the remote server at the top of Search Engine's lists to encourage Internet user access to the remote database.

The interpreter, incorporating artificial intelligence for considering search requests for AV data stored in the remote database, preferably comprises: means for determining search criteria for the remote database using the specific wording of the search request; means for identifying equivalent representation of the search request and subsequently determining search criteria for the remote database using the equivalent representation; means for considering the search request as containing an error and determining search criteria for the remote database using a corrected version of the search request; and means for understanding the meaning of the search request and determining search criteria for the remote database based on the meaning. This combination of AI provides the database search function with enough intelligence to guess what the user wanted to search and thereby maximise the possibility of determining a correct search result.

It is to be appreciated that the term artificial intelligence (AI) as used in the present application is intended to have its normal meaning (see for example 'Microsoft® Computer Dictionary' 4$^{th}$ Ed. 1999). However, for completeness of understanding an explanation of AI and how it works is now given.

The most known AI computer is a parallel-processing computer built by IBM called Deep Blue. Deep Blue can examine 200,000 chess moves per second and, when it finds a series of moves that enables it to win the game, it remembers these moves. Next time it plays a game it will try to utilise these winning moves. It is artificially intelligent as it is learning the moves that win. By playing better and better players, it learns to win against better players.

AI has previously been used in a Search Engine/Portal for the Internet. For example, if one goes to the Altavista search engine web site and types "Ford Orion", the Altavista search engine can return several different results:

Ford=River

Ford=Henry Ford

Ford=President

Orion=Constellation

Orion=Film Company

Orion=Type of Car

An artificial intelligent object looks at the thousands of pages returned and notices that of the 3,000 people who have searched "ford orion", 2,800 selected the tab that linked to the web site: www.ford.co.uk.

The next time a search request for "ford orion" is entered into the Altavista search engine, the Ford web site will be the first link to be returned.

The Altavista search engine has as a result of this process learned that people who search the term "ford orion," are most likely to be looking for a car manufactured by the Ford motor company etc. etc.

However, existing search engines/portals only use AI at a basic level as described above. Now if the search term typed is "ford or Yon", the Altavista search engine will not take the searcher to web sites relating to the term 'Ford Orion'. This is because the Altavista search engine cannot interpret the term 'oryon' as a type, phonetic or spelling error for the term 'orion'.

The present inventor has appreciated that the criteria which separate a fair search engine/portal from a good one are:
a) its ability to interpret what you want even if the text typed into the text search box contains a typing error or an inaccurate description;
b) its ability to mine its own database for required information;
c) its ability to mine the Internet for information it wants;
d) its ability to ignore information it does not want; and
e) the speed it can carry out any, all or multiple instances of the above.

In the interpreter used in the above described remote server of an embodiment of the present invention, all of the above criteria have been considered and the interpreter has been optimised to enhance its performance.

The interpreter may further comprise a list of frequently searched data, the interpreter being arranged to compare the search request with the list and on finding a match to use the matched data as search criteria for the remote database. This advantageously provides a quick solution to the meaning of the search request. The other AI steps of trying to understand what the search request means are bypassed and the generation of a stream of database queries for determining the correct understanding of the search request is avoided.

The AV data composing apparatus may be arranged to record a user-determined compilation of AV data on an AVDDM (Audio/Video Distributable Data Medium), the AV data composing apparatus comprising: at least one data compilation device for defining desired AV data records to form a compilation; and control means arranged to convert any retrieved or received AV data records into a format suitable for recording the compilation on the AVDDM.

By arranging the AV composing apparatus to download such AV data records, the size of the local AV database need not be too large, thereby keeping costs to a minimum. Also for multiple AV composing apparatuses a common central database (the remote database) can be accessed, thereby reducing the updating effort required for a large system.

The AV data composing apparatus may further comprise an AVDDM recorder for recording the compilation of selected AV data records on an AVDDM (a DVD for example). This enables the AVDDM to be created locally at the user's location and also rapidly for immediate purchase. Alternatively, the AV data composing apparatus may further comprise means for recording the compilation of selected AV data records on a data storage and playback device (MP-3 player for example). This enables the data to be transferred to a user's portable MP-3 for immediate use.

The at least one data selection device may comprise a plurality of data selection devices and the control means may be arranged to process a plurality of selected compilations. Multiple users can all be networked to a single AV data composing device and can all be making their selections effectively at the same time. Preferably, each selection device comprises a GUI as described above.

The AV data composing apparatus may further comprise a GUI for displaying and changing the current status of the recording procedure and the estimated time of completion. This enables an operator to monitor how the apparatus is operating and at a glance provides the user with an idea of how long the recording process will take.

Preferably the AV data composing apparatus further comprises means for accepting payment from the user for the selected compilation, the payment accepting means being arranged to conduct a financial transaction authorization from a remote authorization centre. The apparatus can take payment for the selection and can process this immediately, seeking on-line authorization before the AVVDM is created.

Preferred embodiments of the present invention will now be described by way of example with reference to the accompanying drawings. In the drawings.

Figure 23:
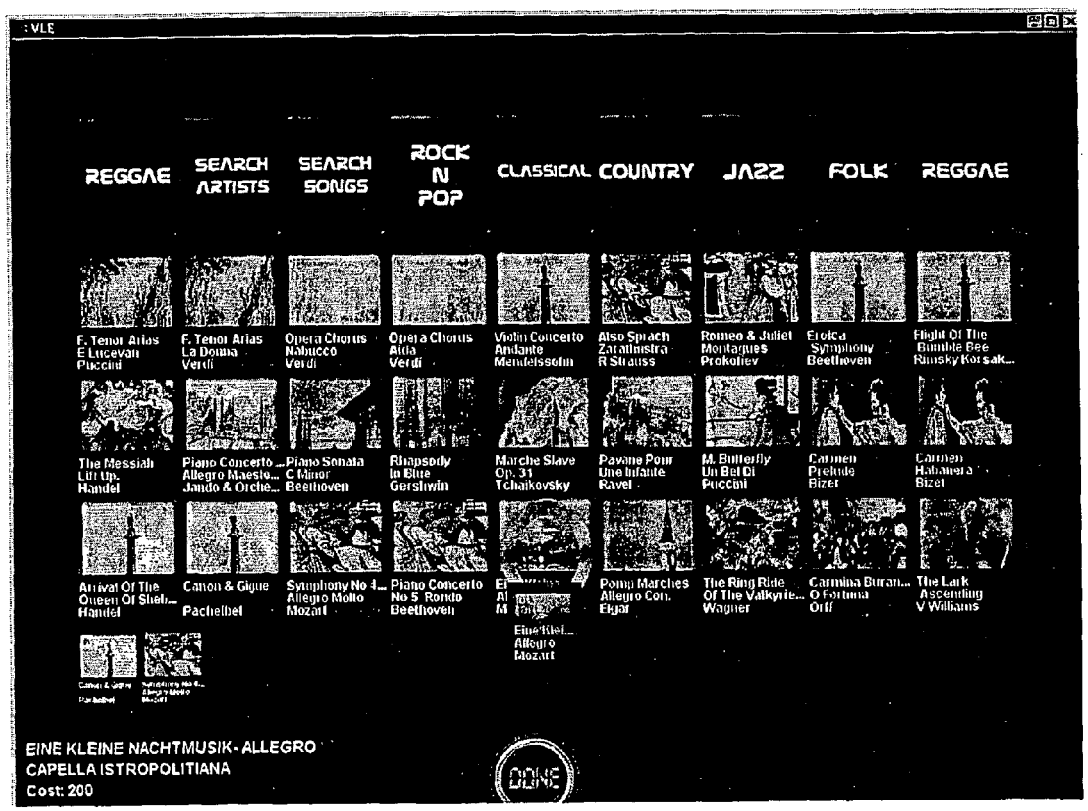
Figure 24:
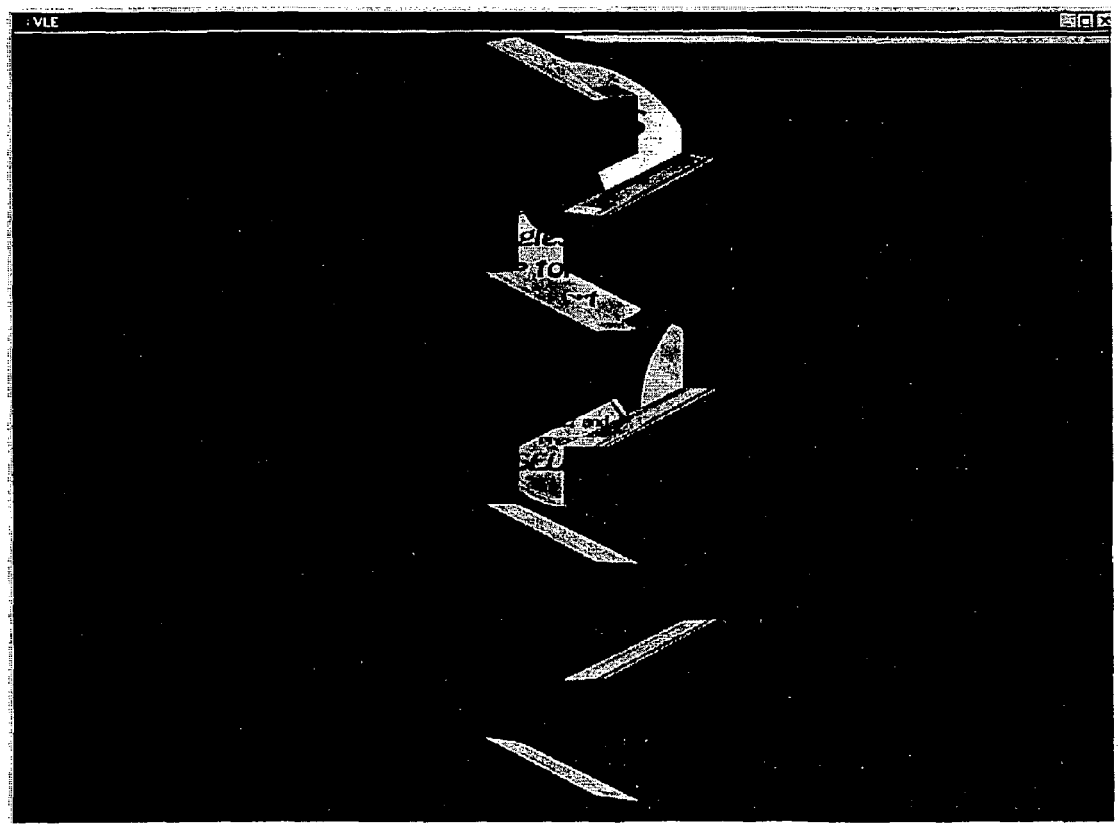
Figure 25:
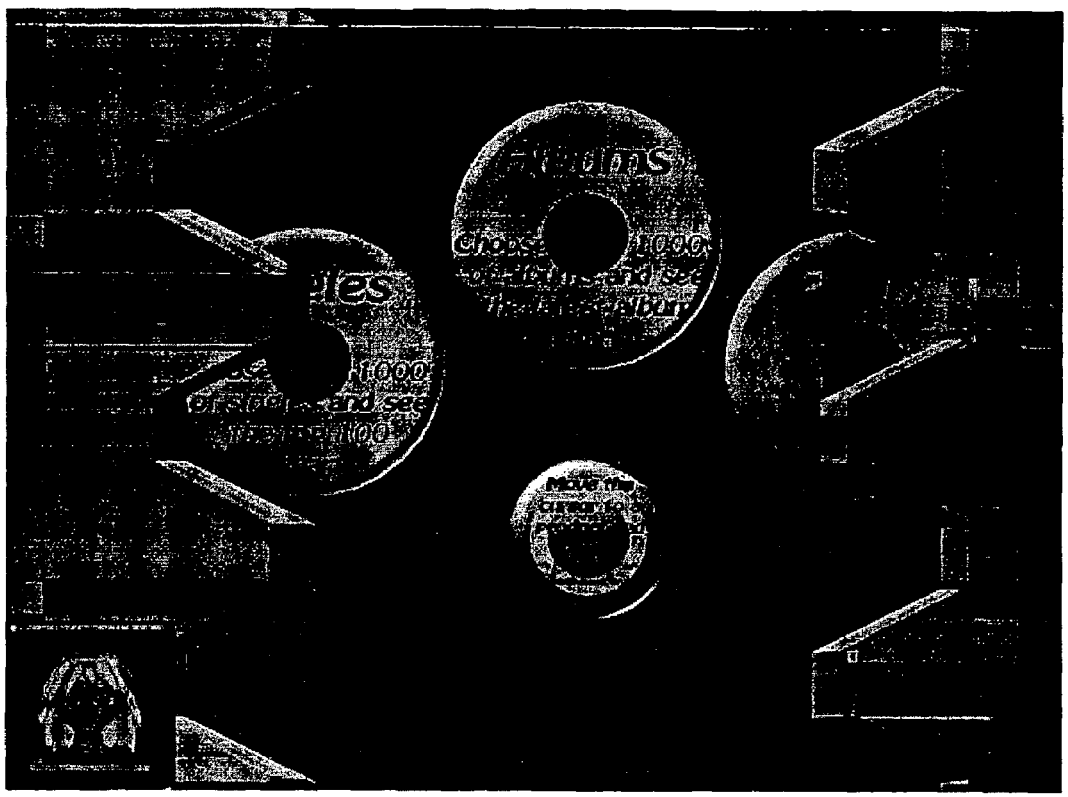

FIG. 23 a detailed view of a VMS Headset GUI according to a fifth embodiment of the present invention showing the GUI at an intermediate stage of its use with two items selected in the chosen songs list and the selection of a third item being made;

FIG. 24 is a detailed view of the VMS Headset GUI of the fifth embodiment showing an initial operating page with the doors in a closed position; and FIG. 25 is a detailed view of the VMS Headset GUI of the fifth embodiment showing the initial operating page with the doors in an open position.

Referring to FIGS. 3 to 11, there is now described a system hereinafter referred to as the VMS (Virtual Music Store) system of a first embodiment of the present invention. The VMS system 10 is a scaleable Internet audio distribution system. It is capable of delivering all types of audio-visual content such as text, audio, video and graphics, to the user. The VMS system 10 can also be described as an end-to-end digital distribution system.

In the present embodiment, the VMS system 10 is set up to allow the user to prepare a desired song selection and then have desired songs recorded on a CD which is given to the user.

Figure 1:
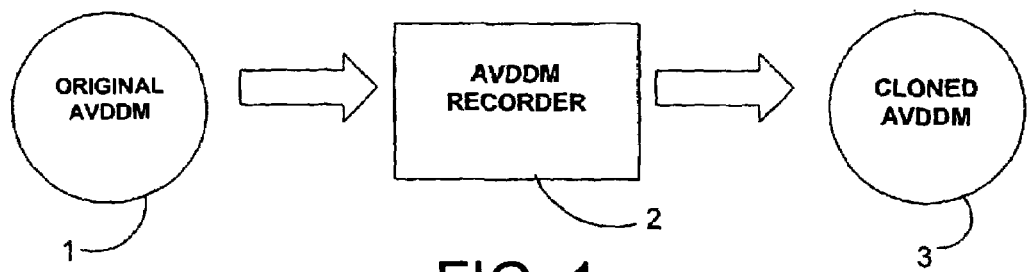
FIG. 1 is a schematic block diagram showing a conventional method of recording AVDDMs using a preprepared copy of the AVDDM.
Figure 2:
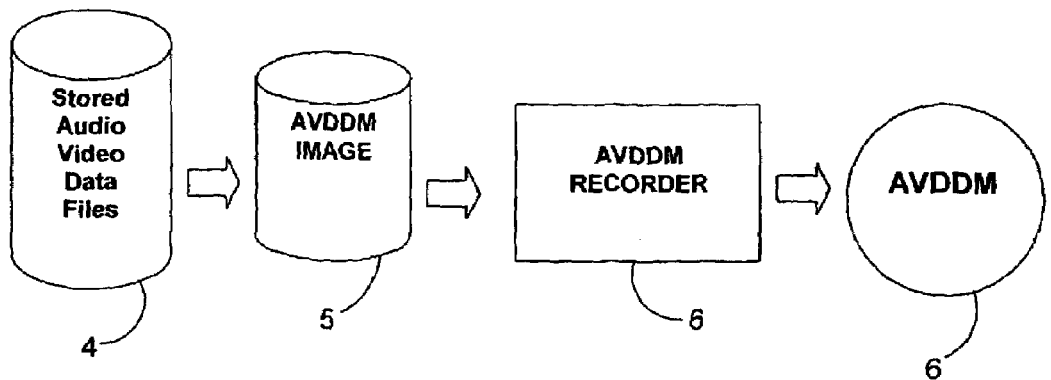
FIG. 2 is a schematic block diagram showing another conventional method of recording AVDDMs using a digital image of the AVDDM.
Figure 3:
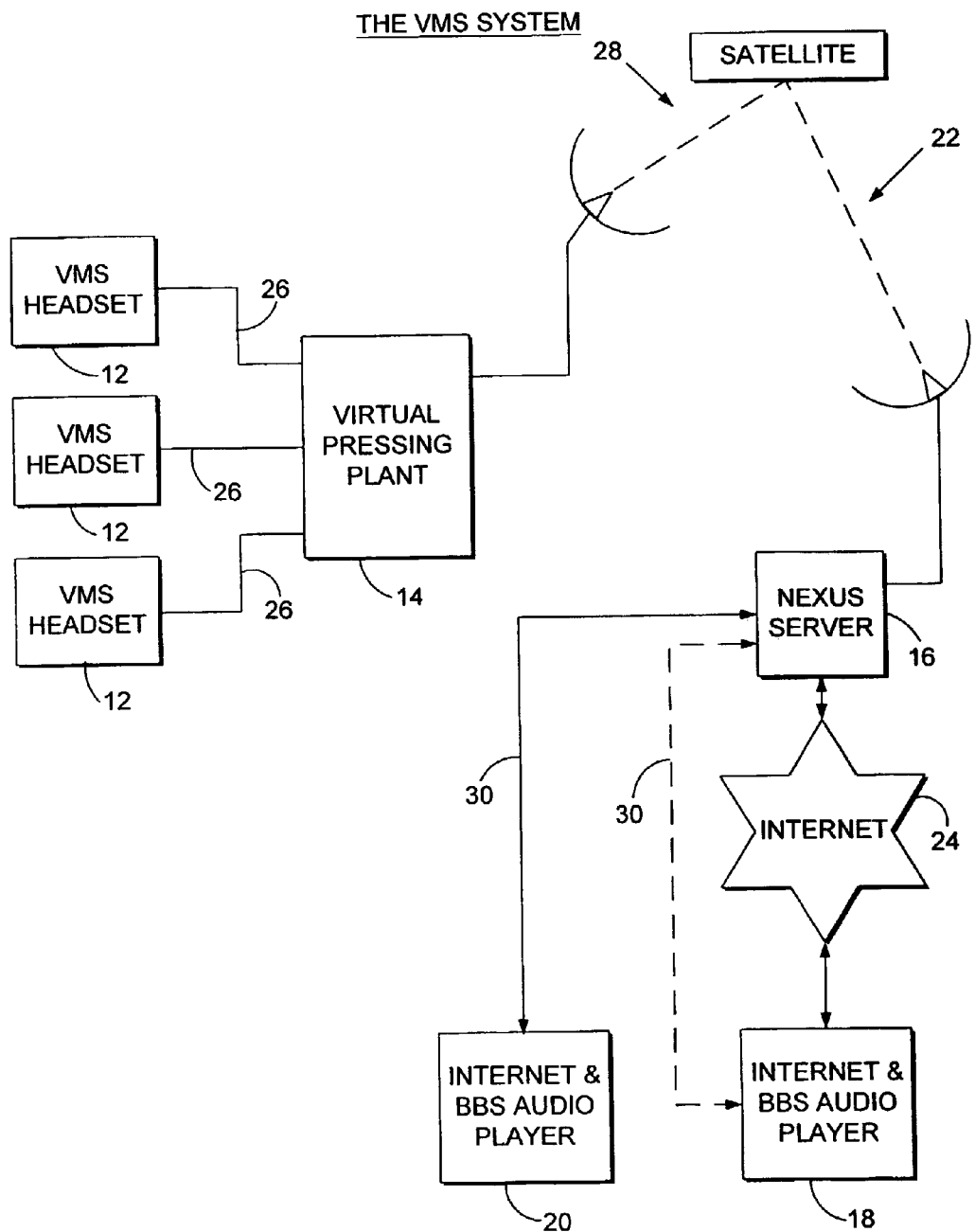
FIG. 3 is a schematic system block diagram showing a VMS (Virtual Music Store) system according to a first embodiment of the present invention.

Customers can access the VMS system 10 via high-street terminals or via the Internet. The system 10 enables customers to purchase songs and have these songs in the following ways:

a) recorded onto a CD while they wait;
b) recorded onto a CD at a different location and sent by mail to their home;
c) downloaded onto a MP-3 (MPEG Audio Layer-3) handheld player while they wait within the store;
d) downloaded direct to their computer and recorded onto their own CD recorder;
e) downloaded onto the hard disk of their computer in protected MP-3 format;

As shown in FIG. 3, there are five component parts of the VMS system 10:

A) Virtual Music Store Headsets 12 and associated software;
B) a Virtual Pressing Plant (VPP) Server 14 and associated software;
C) a Nexus Server 16 and associated software;
D) an Internet and BBS audio player 18 and an equivalent BBS audio player 20; and
E) a Network 22.

The Nexus Server 16 is the most complicated part of the VMS system 10. Not only does it act as an audio server, but it also acts as an intelligent portal/search engine with a built in agent to access and crawl the Internet 24.

The VMS system 10 has been designed in an object oriented manner and therefore advantageously can not only be implemented in stages but enables the system to be readily debugged during its assembly.

The function of each one of these component parts is now described in detail.

The VMS Headsets 12 each comprise a standard PC (Personal Computer) with a fifteen inch LCD (Liquid Crystal Display) screen (not shown). The VMS Headsets 12 enable customers in stores to pick and choose a number of songs and send their choice via a local network 26 to the VPP Server 14. A Graphical User Interface (GUI—see FIGS. 4 to 6) provided at each VMS Headset 12, creates a "no-brainer" (easy-to-use) interface for the customer.

The VPP Server 14 (shown in detail in FIGS. 7 and 8) comprises a standard Personal Computer (PC), a Compact Disc (CD) Robot and VPP Server software. Customer choices are sent via the standard network 26 from each VMS Headset 12 to the VPP Server 14. The VPP Server 14 finds the requested song (if it is not available locally, it is downloaded from the Nexus Server 16), instructs the CD Robot, records the CD and then prints the song details on the CD cover and the CD itself.

The Nexus Server 16 (shown in detail in FIGS. 10 and 11) is a mainframe based media data warehouse which is powered by an aggressive Internet Agent, a web crawler, a web page generator, a portal display, a search engine, a database, an automatic mailer and an on-line banking facility. It can be connected to any network 22 be it satellite, wireless, copper line or cable TV. In the present embodiment, a satellite link 28 between the VPP Server 14 and the Nexus Server 16 is provided.

The Nexus Server 16 includes a database of digitised songs that can be accessed by private telephone lines 30 or by the Internet 24. Customers at kiosks request songs and pay for them. The Nexus Server 16 then creates a sales log and delivers a CD of the requested songs. The Internet audio player 18, which is a duplication of the VMS Headset software, enables customers to contact the Nexus Server 16 directly and download songs for recordal on a CD or otherwise.

The VMS Internet/BBS audio player 18 enables customers to link to the Nexus Server 16. It contains software to run via the Internet 24 and additional software to dial the Nexus Server 16 directly.

Direct customers can link directly to the Nexus Server 16. This enables the Nexus Server 16 to operate as a Bulletin Board System (BBS) and hence provide download speeds over the standard phone lines 30 that enables songs to be downloaded in 1.2× real time using a 56 Kb/sec modem and twice real time via an ISDN line.

Internet customers can use the Nexus Server 16 in exactly the same way they would use a VMS Headset 12. They can use the service to select songs and have a CD created and sent to them via mail. They can alternatively opt for the CD to be sent to a place to be picked up by them. If Internet customers want to download songs and record their CD at home, they can directly connect to the Nexus Server 16.

The Internet/BBS audio player 18 looks and works exactly like the VMS Headset GUI. It enables customers to record songs via any MMC SCSI 3 compliant device (all CD recorders are now MMC SCSI 3 compliant) or any IDE (Integrated Device Electronics) device.

The BBS audio player 20 is identical to the Internet/BBS audio player 18 except for its communication with the Nexus Server 16. In this regard, the BBS audio player 20 is connected with the Nexus Server 16 directly via a modem and a telephone line 30 rather than via the Internet 24. Whilst this can be a more expensive option than connection via the Internet 24, it is substantially faster and may be preferred for time-sensitive usage.

The VMS system 10 is linked together in a variety of ways. VMS Headsets 12 are linked to the VPP Server 14 via the standard network 26 of 10/100 base T RG45 cables. The VPP Server 14 is linked to the Nexus Server 16 via the satellite link 28. (However, the VPP Server 14 can be connected to the Nexus Server 16 via any other networking technology). The Nexus Server 16 is connected to its customers via the VMS Headset/VPP Server route, via a direct connection 30 or via the Internet 24.

Having described the basic parts of the VMS system 10, the operation of each part in providing a service to the user is now described in detail.

VMS Headset Operation

Figure 4:
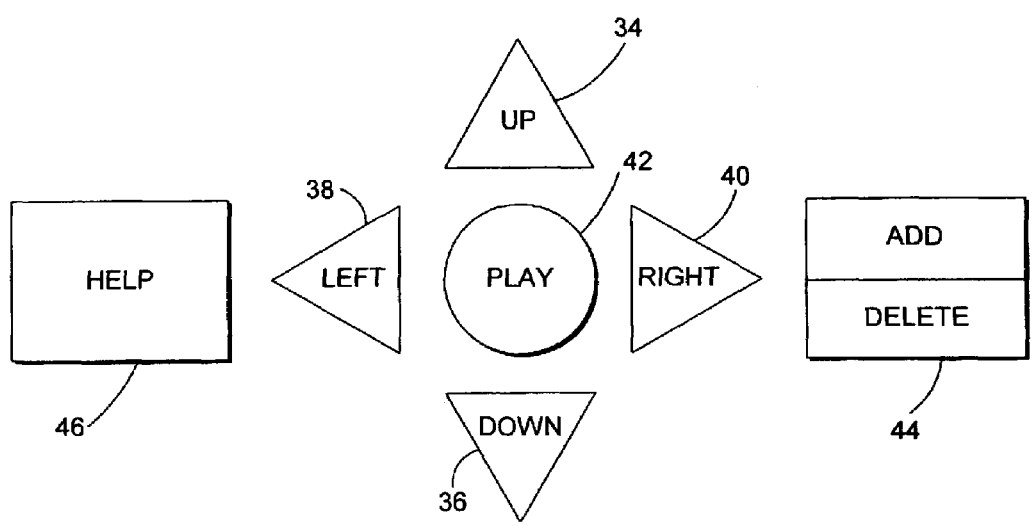
FIG. 4 is a schematic representation of arcade game push buttons forming part of the VMS Headsets shown in FIG. 3.

When a customer walks up to a VMS Headset 12, they first see a video called eyecatcher.avi. The purpose of this video is to get the customer's attention. The VMS Headset 12 has seven operating buttons 32 as shown in FIG. 4. These buttons are 'up' 34, 'down' 36, 'left' 38, and 'right' 40 for controlling cursor movement, 'play' 42 for listening to the audio track associated with the selected item, 'add/delete' 44 for selecting or deleting items from a chosen songs list and 'help' 46 for information assistance. The help button 46 can be pressed at any time to play a help video. When the customer initially touches any other button 32, the VMS Headset 12 plays a video called welcome.avi. This welcome video introduces the customer to the VMS system 10 and how to operate it.

The customer is then presented with a GUI (see FIGS. 4 to 6) that enables them to move a cursor up, down, left or right by use of the appropriate buttons 32. The GUI consists of a tree-type directory leading to tables of songs. Each song is identified by a small graphical representation (graphic) which is displayed in the GUI. The customer may move the cursor over the graphic representing the song they want to listen to and then press the play button 42 and the VMS system 10 will play a twenty to thirty second sample of the selected song. If the customer likes the song, they can add it to their list of chosen songs by pressing the add/delete button 44 and the song's graphic is then displayed in the chosen songs list.

When the customer has chosen all their songs, they can change the order in which they will be recorded by highlighting a song and dragging it with the left and right buttons 38, 40.

When the customer is ready to record the songs in the chosen song list, they simply move the cursor over a record icon and press the play button 42.

The VMS Headset 12 then plays an "are you sure" video and the customer is given a last opportunity to go back and change any of the selected songs in the chosen song list. If the customer wants to go ahead and record the CD they are then asked to enter a title for their CD. (This information will appear on the spine of the CD). Once entered, all the song names and the customer's CD title are sent over the standard network 26 to the VPP Server 14. The customer is then told to go the counter to pay and pick up their CD.

VPP Server Operation

The VPP Server 14 has a GUI (not shown) which contains the status of each CD Recorder, a list of all the compilation albums that have been chosen and not paid for, and a list of all the compilations that are waiting to be recorded. The VPP Server GUI displays the approximate time a new customer would have to wait to make a given CD.

The customer goes to the VPP Server counter and says they have compiled an album which the have titled "Amanda's Mix" for example. The VPP Server operator looks through the list of compilations and finds the one titled "Amanda's Mix", highlights it and activates the printing process by pressing a button marked 'print' (not shown).

The VPP Server 14 then prints the front cover of the CD containing the song details, the title and a barcode on it. This barcode is a standard UPC (Universal Product Code) barcode, which consists of two parts. The first part identifies the CD as a VMS album/single and its cost and the second part identifies a Customer Number.

The VPP Server operator then asks the customer if they are happy with the CD's contents. If the customer is happy, the VPP Server operator uses a standard laser barcode reader to read the barcode into the retailer's cash till. This first part of the barcode registers on the retailer's till and generates an amount to pay. The customer pays for the CD and the VPP Server operator adds the CD to the "waiting to be recorded" list.

The VPP Server 14 firsts checks if all the songs are held locally, if some are not, it contacts the Nexus Server 16 and downloads the required song. The VPP Server 14 then instructs the CD Robot to place a blank CD into a CD recorder and record the album. Once the CD is recorded, the VPP Server 14 instructs a CD printer to print the track details and a customer barcode on the CD.

When the customer's CD is ready, the VPP Server operator simply matches the barcode on the cover with the barcode on the CD. The operator then gives the customer the CD.

Nexus Server Operation

The Nexus Server 16 is the main database and songs repository for the VMS system 10. The Nexus Server 16 uses the Windows® NT4 operating system. It can be ported to any other operating system if necessary with the minimum of effort.

When the VPP Server 14 needs a song, it signals the Nexus Server 16 with a song request. The Nexus Server 16 searches its database, finds the song and delivers it back to the VPP Server 14.

Additionally, the Nexus Server 16 enables Internet customers and BBS customers to link to it and select songs with a GUI identical to that of the VMS Headsets 12. These selected songs can be downloaded or mail ordered on a CD.

The Nexus Server 16 also includes an aggressive Internet Agent which is controlled by a program called "ME" which is written as an Artificially Intelligent program (AI).

The Internet Agent ensures that the Nexus Server 16 has a high profile on the Internet 24 and that the data held in its database is correct. The Internet Agent can also extract data from other web sites, cross reference it with existing data, store this new data and publish it. By aggregating the data from multiple sites, the Nexus Server 16 can create a unique database and a unique site.

The Nexus Server 16 monitors itself, monitors the Internet 24, and collects and stores data from the Internet 24. It ensures that all relevant Internet links lead to it. If the existing links do not; the Nexus Server 16 creates links and pages and registers these on all Internet Search Engines. This is called an Automatic Web Page Registering Service. The Nexus Server 16 monitors the results in increased traffic created by these new links and stops creating more links when the traffic hits the required threshold. Additionally, the Nexus Server 16 can also generate WAP (Wireless Application Protocol) Internet 24 to pages which will link the Nexus Server 16 to mobile phone users. It is envisaged that as mobile phone companies increase mobile phone bandwidth and add storage media, that many customers will use their mobile phones as hand-held media players.

The Nexus Server's Automatic Web Page Registering is carefully set up to ensure that it does not irritate or flood existing Internet portals.

A detailed description of the hardware and software used in the present embodiment is now described.

The VMS Headset

As mentioned previously, each VMS Headset 12 comprises a standard PC and LCD screen (not shown). The PC has a video card, sound card and a network card. Connected to the PC is an audio amplifier, a pair of headphones, a pair of speakers and the seven arcade-game push buttons 32 as previously described and shown in FIG. 4.

Figure 5:
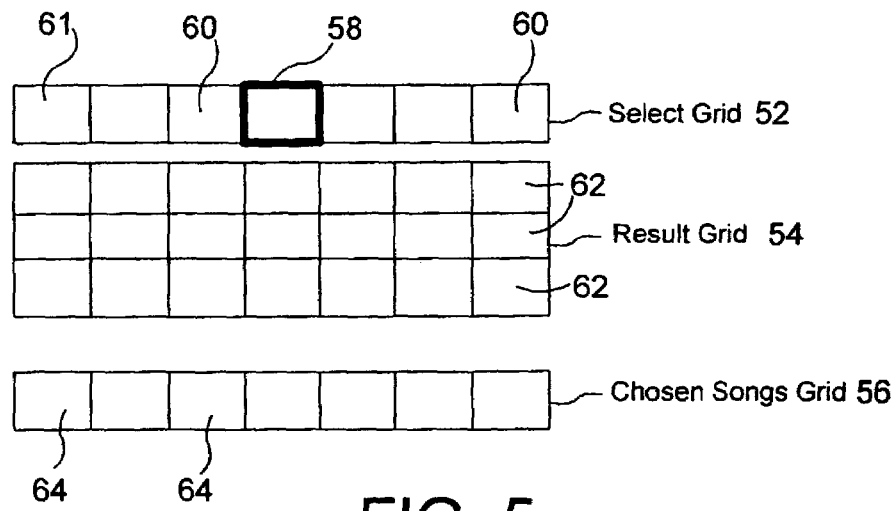
FIG. 5 is a graphical representation of GUI (Graphical User Interface) of each VMS Headset shown in FIG. 3.

In the present embodiment the VMS Headset 12 also comprises the VMS Headset GUI 50 shown in FIG. 5. The VMS Headset GUI 50 is presented on screen as three grids 52, 54, 56 and a screen cursor 58 movable by way of the arcade-game push buttons 32. The three grids are:

i) a Select Grid 52 (used to select genres, styles, search etc.);

ii) a Result Grid 54 (used to display sub genre, styles, and search and songs); and iii) a Chosen Songs Grid 56 (used to display the songs selected by the customer).

In each cell 60, 62, 64 of each grid 52, 54, 56 is an image (graphic) and each image is linked to an action. The actions evoked by placing the cursor 58 over each cell 60, 62, 64 are detailed in a text file called a .gdf file.

The VMS Headset GUI 50 is structured in the form of a directory tree. The Select Grid 52 is the top directory. Each Select Grid cell 60 links to and displays its own particular Result Grid 54. Each cell 62 of a Result Grid 54 displays an image (graphic) representing a song but it can also display other Result Grids 54 or provide a link to a new Results Grid 54 on selection.

When the cursor 58 is over a song graphic in the Results Grid 54, pressing the add/delete button 44 adds this song to a list of chosen songs with the graphic of the song appearing in the Chosen Songs Grid 56. If the cursor 58 is moved over a graphic in the Chosen Songs Grid 56 and the add/delete button 44 pressed, the selected song is removed from the chosen songs list and the graphic is also deleted from the Chosen Songs Grid 56.

The following is an example of how the VMS Headset GUI 50 may be used to select and/or input different information from/into the VMS system 10. In this example, a first grid at the top of the VMS Headset GUI 50 is the Select Grid 52. Within this grid 52 appears a bitmap image called select.bmp. Each area of select.bmp is divided into a "Cell" 60. By pressing the left or right buttons 38, 40 the select.bmp image is moved left or right until the desired cell 60 is under the cursor 58. The cursor 58 remains in the centre of the screen at all times.

Figure 6:
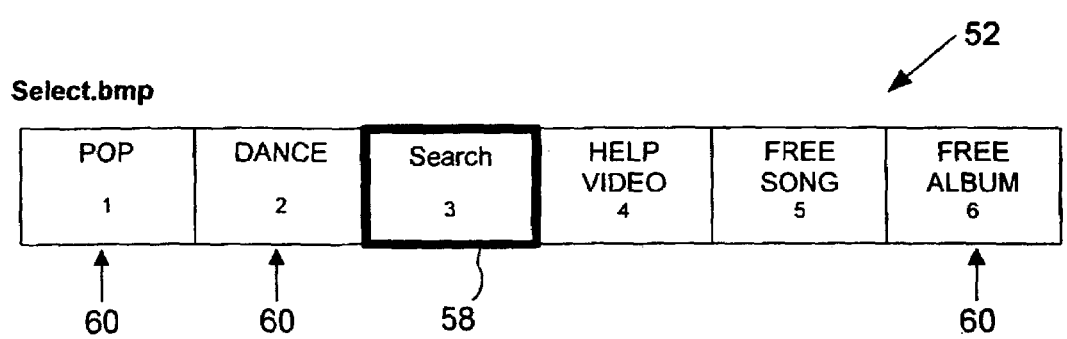
FIG. 6 is a detailed graphical representation of an example of the images displayed in the select grid of the GUI shown in FIG. 5.

In this example, the select.bmp image is shown in FIG. 6. A file called 'select.gdf' describing this image is given below:

```
        #Dimension
        1:6
        #
        #Action         Argument
        #
        Selector        Pop.gdf
        Selector        Dance.gdf
        Selector        Search.gdf
        Video           Help.avi
        Music           FreeSong.cbr
        Selector        FreeAlbum.gdf
```

The above file "select.gdf" tells the VMS Headset GUI 50 that the Select Grid 52 has one row with six columns. Cursor movement within the above Select Grid 52 causes the following actions to occur:

if the cursor 58 is over Cell 1, Pop.bmp will be displayed in the Results Grid;

if the cursor 58 is over Cell 2, Dance.bmp will be displayed in the Results Grid;

if the cursor 58 is over Cell 3, Search.bmp will be displayed in the Results Grid;

if the cursor 58 is over Cell 4, a video called help.avi will be played;

if the cursor 58 is over Cell 5, a song called Freesong.cbr will be played; and if the cursor 58 is over Cell 6, FreeAlbum.bmp will be displayed in the Results Grid.

There are many actions that can be called by a .gdf file including video (plays a video), music (plays a song or a sample), multiselect (adds a whole album to the Chosen Songs Grid 56), and static (tells the VMS Headset GUI 50 to do nothing).

It is to be appreciated that the cursor movement operates in two different ways. When the cursor 58 is on the cell 60 in the Select Grid 52 the action is immediate, i.e. in the above example when the cursor 58 is moved over the POP image, the Results Grid 54 will immediately display the POP.bmp image. However, when the cursor 58 is on a cell 62 in the Result Grid 54, the customer must press the play button 42 to active the action.

In order to aid the customer in knowing the range of movement which is available, the GUI comprises a range overlay which identifies the movement areas in the grids of the GUI. The range overlay simply defines the boundaries of cursor movement available to the customer and in relation to the three grids, is in the shape of a cross.

The VPP Server

Figure 7:
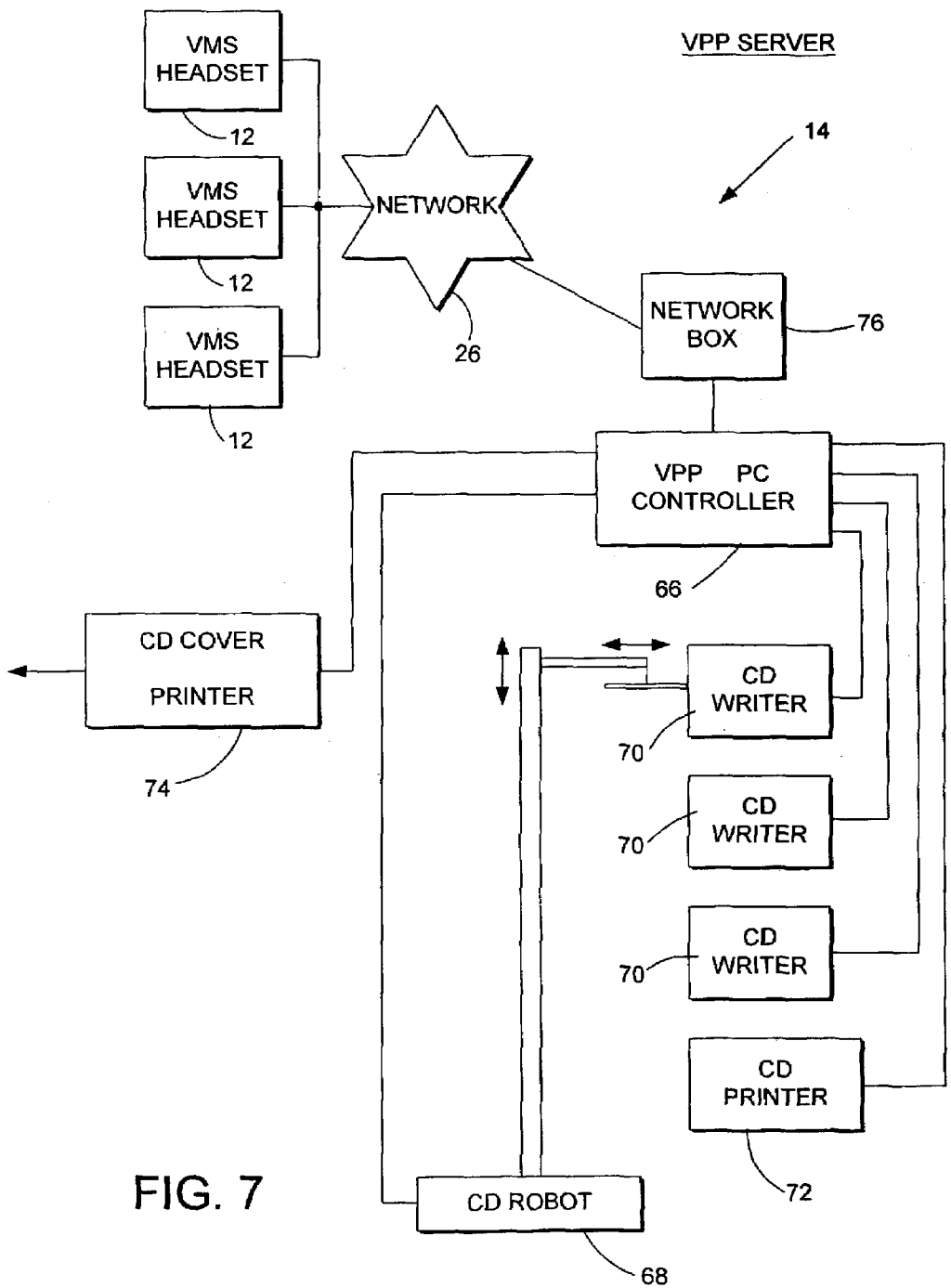
FIG. 7 is a schematic system block diagram showing the VPP Server of FIG. 3 in detail and its connection to the VMS Headsets.
Figure 8:
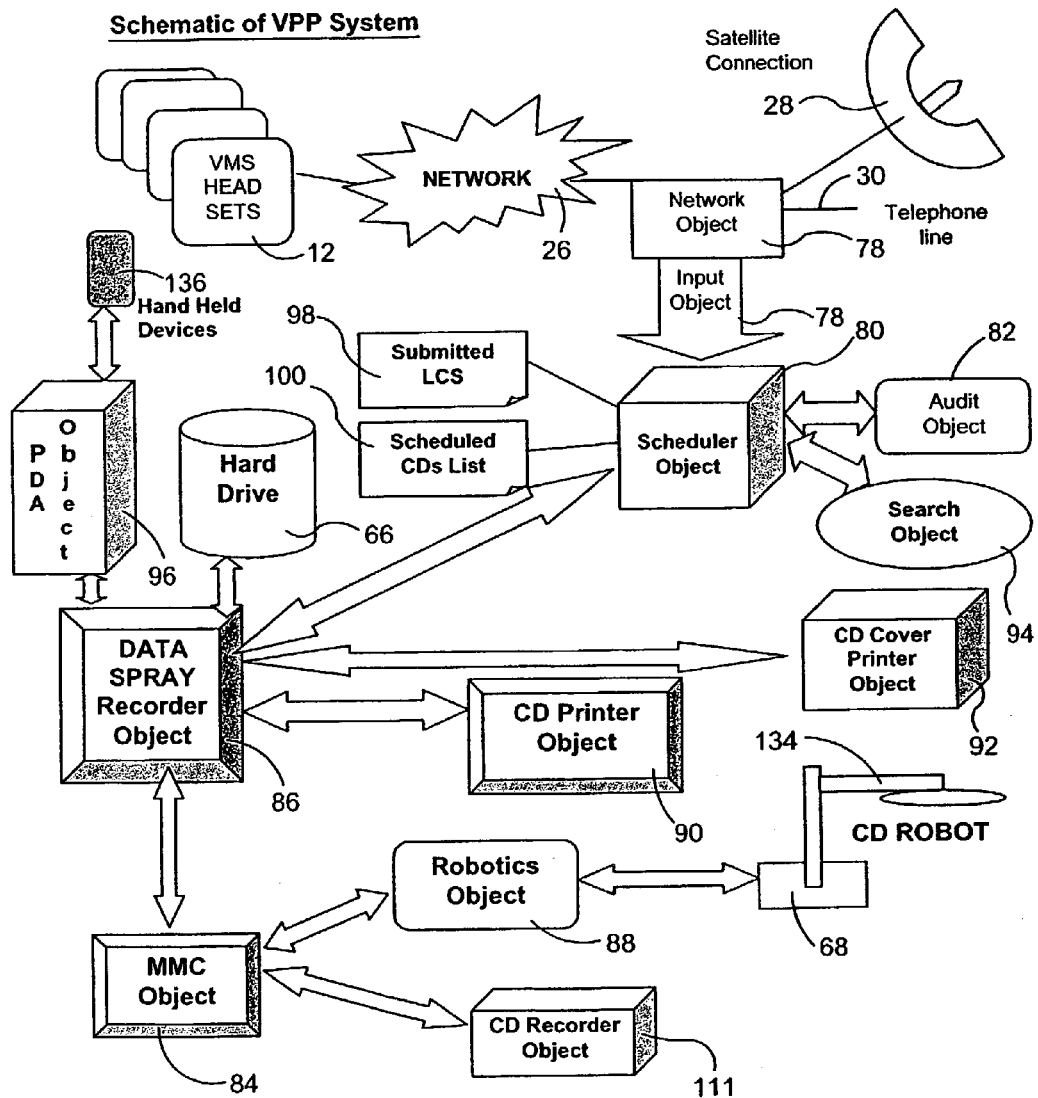
FIG. 8 is a schematic block diagram of the VPP Server of FIG. 7 showing its object orientated software modules in detail.

Referring now to FIGS. 7 and 8, the VPP Server hardware of this embodiment comprises a high-specification PC 66, a CD Robot 68, three CD writer/recorders 70, a CD printer 72 and a CD cover printer 74. A network box 76 enables the VPP Server 14 to communicate with one or more VMS Headsets 12 via the network 26.

The VPP Server code has been written in a modular-orientated manner and consists of the following distinctive modules as shown in FIG. 8:

A) a Networking and Connectivity Object 76;

B) an Input Object 78;

C) a Scheduler Object 80;

D) an Audit Object 82;

E) a MMC Object 84;

F) a Data Spray Recorder Object 86;

G) a Robotics Object 88;

H) a CD Printer Object 90;

I) a CD Cover Printer Object 92;

J) a Search Object 94;

K) a PDA (Personal Digital Assistant)/Handheld Object 96; and

L) a Graphical User Interface.

Each of the above objects is now described in further detail.

Networking and Connectivity Object

This object 76 is used to enable the VPP Server 14 to communicate over the network 26 to which it is connected. The VPP Server 14 includes full networking capabilities and can thus be operated and controlled remotely and can decode/download files held on other systems to which it is networked. This networking can be via a variety of networking protocols including but not being limited to NetBui, TCP/IP, Netware, IPX, SPX, UDP, etc. The VPP Server's networking capability enables AVDDM such as a CD to be created remotely and enables songs to be downloaded via the telephone line 30 or the satellite link 28.

Input Object

This object 78 listens for a network message or can view a shared directory for a List of Customer Songs (LCS file) from the VMS Headset GUI 50. When the Input Object 78 receives this information, it checks to see if the file format is correct. If it is, the Input Object passes this data to the Scheduler Object 80.

Scheduler Object

This object 80 schedules the events of other objects. The Scheduler Object 80 first checks to see if the songs are available locally or have to be downloaded from the Nexus Server 16. The Scheduler Object 80 then displays the LCS file in the Submitted songs list 98. Once the Scheduler Object 80 has received confirmation from the Audit Object 82 that the customer has paid, the Scheduler Object 80 transfers the LCS file into the Scheduled CD List 100. If any of the songs in the LCS file are not held locally, the Scheduler Object 80 downloads them from the Nexus Server 16.

Audit Object

When a customer pays for a CD, a file is created containing that customer's LCS and the current time and date. This file of information is called an Audit File and it is used to audit the system. Once an Audit File has been created, the LCS is transferred to the Scheduled CD List 100. Although not shown, the Audit Object 82 is connected to a credit card transaction system utilising standard on-line credit card clearance software which enables the user to pay for the compilations directly at the VMS Headset 12. The AVDDM is not prepared until the credit card authorization center has approved the transaction. It is also possible for the Audit Object 82 to be connected to any EDI (Electronic Data Interchange) transaction system.

The Audit object also keeps a log of the number of times each song is selected by the customers. This is useful for accounting purposes and gives useful feedback on the most popular selected songs. Also a log of the number of songs which are sampled by the customers is also retained. This provides useful feedback information for a record company for example regarding the way in which customers browse song lists and their ultimate selections.

MMC Object

The Data Spray Recorder Object 86 (described in detail later) communicates with all AVDDM hardware devices (CD Robot 68, CD Writer 70) by a protocol called MMC compliant SCSI 3. This protocol calls to and from these AVDDM hardware devices and is controlled by an object called the MMC Object 84. Most recording devices use MMC SCSI 3 enabling the Data Spray Recorder Object 86 to record CD Audio, CD ROM, computer games disks, DVD and DVD RAM. The Data Spray Recorder Object 86 can also communicate with devices connected to USB (Universal Serial Bus) ports, Firewire ports, Parallel, Serial, 10/100 base T and Infrared IDRA ports via the PDA/Handheld Object 96. The MMC object 84 is also connected to the Robotics Object 88 so that it can instruct the CD Robot 68 to place a CD in one of its AVDDM Writers/Recorders 70.

Data Spray Recorder Object

Figure 9:
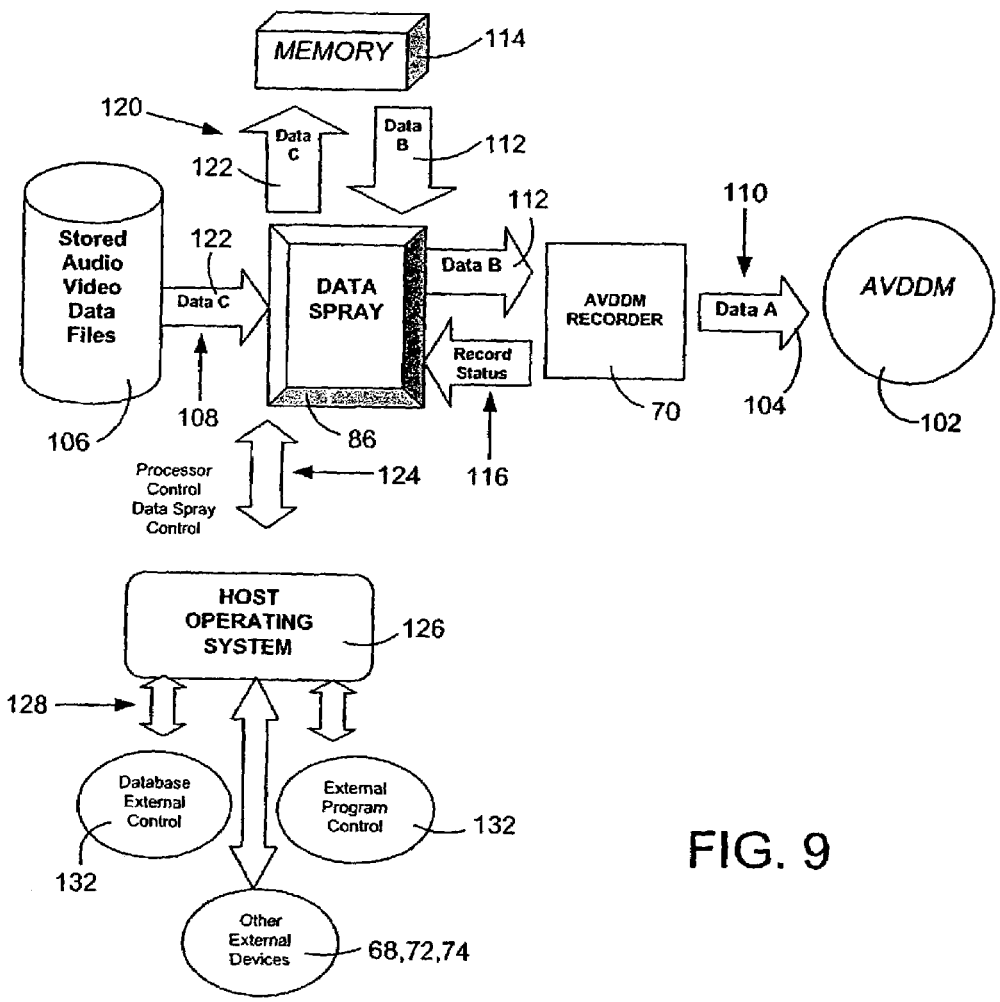
FIG. 9 is a schematic system block diagram showing the operation of the data spray module shown in FIG. 8 in the VPP Server.

The Data Spray Recorder Object 86 comprises a suite of software for implementing a decoding and recording algorithm which enables the rapid creation of AVDDM by simultaneously decoding, creating and recording the AVDDM. The Data Spray Recorder Object 86 manages the data flow to and from the AVDDM recorders 70 (though only one is shown in FIG. 9) and to and from a section of the PC's fast access memory 114 to ensure the AVDDM recorder 70 has a constant and sustained flow of data to optimise it's recording process.

The operation of the Data Spray decoding and recording algorithm is now described with reference to FIG. 9. When the Data Spray Recorder Object 86 finds a free MMC Object 84, which is connected to a free AVDDM hardware recorder 70, it begins its recording process. The MMC Object 84 instructs the Robotics Object 88 to place a CD in its AVDDM recorder 70. The Data Spray algorithm takes the first segment of encoded data (Data Segment A) 104 from a store of AV data files 106 and decodes it at 108. If required, watermarking information for verifying authenticity of the AV data records being copied and/or any embedded copyright information such as a copyright warning notice, is added to Data Segment A at this point. Data Segment A is then converted at 108 into an AVDDM format and recorded at 110 onto the AVDDM 102 by a CD Recorder Object 111.

While Data Segment A 104 is recording at 110 onto the AVDDM 102, the Data Spray algorithm requests the next segment of data (Data Segment B) 112 which is stored in the PC memory 114 until the Data Spray algorithm completes the recording of Data Segment A 104. A loop back circuit tells at 116 the Data Spray algorithm when Data Segment A 104 has recorded successfully by changing a record status signal 118. Once Data Segment A 104 has been successfully recorded, the Data Spray algorithm begins to record at 110 Data Segment B 112 onto the CD 102 in the AVDDM recorder 70. Simultaneously, the Data Spray algorithm decodes and converts at 108, 120 Data Segment C 122 into an AVDDM format and stores it at 120 in the memory 114.

This cycle continues until the AVDDM recorder 70 has completed recording all of the required segments (in the LCS) at which time the Data Spray algorithm carries out a final check on the format of the recorded CD 102 to ensure that the recording process was successful. Following this, the Data Spray algorithm, if necessary, writes any 'Table of Contents' and relevant copyright information onto the recorded CD 102.

The CD 102 is now finished. The Data Spray algorithm then instructs the MMC Object 84 to instruct the Robotics Object 88 to place the recorded CD 102 into the CD printer 72. The Data Spray algorithm then instructs the CD Printer Object 90 to print identifying information (such as a list of recorded songs, text and graphics) onto the CD 102. In addition, a cover (not shown) for the CD in the form of a cardboard sleeve or, if a standard transparent jewel box is to be used, a paper insert for the jewel box is then printed by the Data Spray algorithm instructing the CD Cover Printer Object 92 to print the desired text and/or graphics onto the CD cover. The CD 102 together with its identifying cover is now complete.

The Data Spray Recorder Object 86 is also connected at 124 to a Host Operating System 126 of the VPP PC Controller 66. The Host Operating System 126 provides a framework within which communication with other parts of the VPP Server 14 can be made. This enables the Data Spray algorithm to control at 128 external databases 130, other external devices 68, 72, 74, and external programs 132.

Robotics Object

The Robotics Object 88 can control any robotic device via a standard PC. The Robotics Object 88 communicates with the CD Robot 68 and monitors the Robot's sensors to ensure that it has carried out the correct operation. If the Robotics Object 88 does not understand or agree with a sensor reading, it can override that sensor and instruct the CD Robot 68 to ignore the sensor reading. This is achieved by using fuzzy logic and ranking of sensor signals into different priorities such that some signals have more importance than others.

The Robotics Object 88 controls a robotic arm 134 (both its position and its picker mechanism) of the CD Robot 68, the position of a CD blank carrousel (not shown) and the position of a CD Printer tray (not shown). Multiple Robotics Objects 88 can be individually assigned to different Robotics Hardware if required.

CD Printer Object

The CD Printer Object 90 enables the operator to control how the text and graphics are printed on the CD 102 itself. The text can be set to "follow a path" and the outline of any shape, graphic or line can be set as the path to follow. In the present embodiment, all of the text to be printed is collated into one long string of characters and this string is then printed on the CD itself as a spiral of alphanumeric information. Multiple CD Printer Objects 90 can be individually assigned to different CD Printers 72 if required.

CD Cover Printer Object

The CD Cover Printer Object 92 enables the printing of the CD cover. Covers can be printed either with text only or as a full cover including graphics, text and multiple pages. The CD Cover Printer Object 92 communicates with the CD Cover Printer 74 which can be any printer, Laser or Ink Jet for example, in order to create the required text and graphics on the CD cover.

Search Object

The Search Object 94 provides connectivity to any standard database that accepts ODBC (Open Database Connectivity Drivers). This includes Microsoft Access™, Oracle™, Sybase™, Informix™, etc. The Search Object 94 can be used to search the locally held songs or to pass a search message onto the Nexus Server 16 when a song is found not to be available locally.

PDA/Handheld Object

The PDA Object 96 enables the VPP Server 14 to transmit AV data to a hand-held device 136 such as a Laptop PC, a Palm Pilot or an MP-3 player for example. Data can be transmitted via printer ports, USB (Universal Serial Bus) connectors and serial ports and can use any transmission medium such as Infra Red as well as transmission standards such as Bluetooth™ and Firewire™.

VPP Server Graphical User Interface

Although not shown, the Graphical User Interface (GUI) is provided at the VPP Server 14 in order to allow the VPP Server operation to be monitored. More specifically, the VPP Server GUI provides the operator with a detailed view of each of the following:

1) the status of each CD Recorder 70;

2) the status of the CD Robot 68;

3) lists of all LCS that have been submitted 98;

4) a list of all LCS that have been paid for 100;

5) the status of the whole network;

6) the cost of each CD to be printed; and 7) an image of the cover to be printed on each CD.

The program makes use of a standardised UI (User Interface) features seen on process control applications. Each CD Recorder 70 has its own window displayed in the GUI where an operator may set or view any features of each CD Recorder 70. Visual icons in the GUI show which CD Recorder 70 contains a CD 102 and whether any CD Recorder 70 is in session. Furthermore, two progress meters displayed in the GUI allow monitoring of the recording length of the current track and of the total CD.

The Nexus Server

Figure 10:
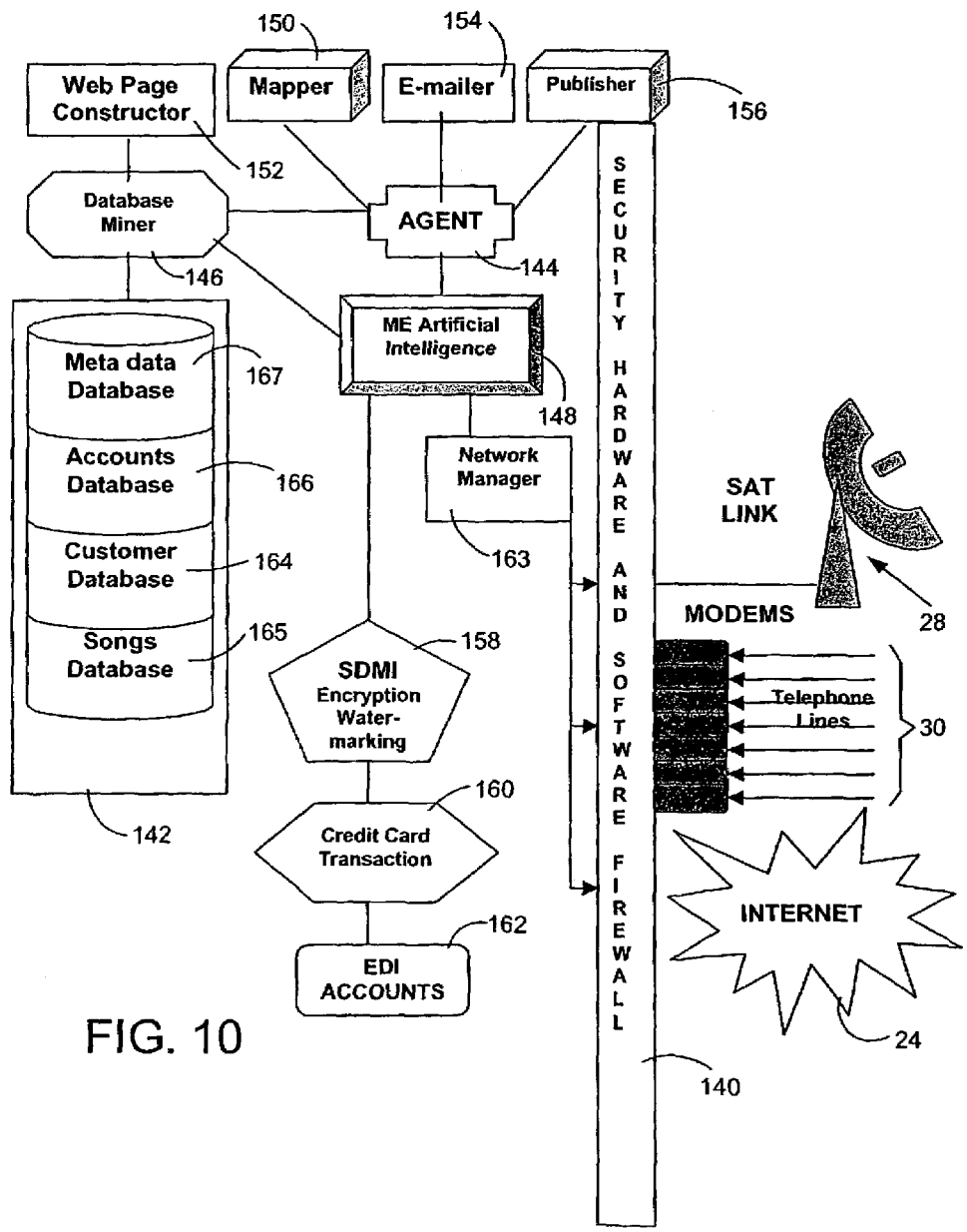
FIG. 10 is a schematic block diagram of the Nexus Server shown in FIG. 3 together with its interconnections to various communication networks.

Referring now to FIG. 10, the Nexus Server 16 is now described in detail.

In terms of hardware, the Nexus Server 16 utilises the latest clustering techniques to produce a truly modular scaleable server. Each module within the Nexus Server 16 consists of a Quad Intel Processor based PC running Windows NT4®. Modules can simply be added to the Nexus Server Cluster to increase its size and efficiency. The modules share a common RAID 5™ hard drive storage array with full redundancy.

The server includes full temperature monitoring, anti-viral and tamper protection and includes a UPS (Uninterruptible Power Supply-not shown).

The Nexus Server Cluster is configured to perform several different functions. These functions, which are listed below, are mostly provided by dedicated software objects.

As seen in FIG. 10, The Nexus Server 16 provides the following resources and functions:

1) Security functions 140;

2) a Database 142;

3) an Agent function 144;

4) a Database Miner function 146;

5) an Artificial Intelligence function 148;

6) a Mapper function 150;

7) a Web Page Generator function 152;

8) an E-mailer function 154;

9) a Publisher function 156;

10) an SDMI Encryption and Watermarking function 158;

11) a Credit Card and Banking function 160;

12) an EDI (Electronic Data Interchange) Accounts function 162; and 13) a Network function 163.

The Nexus Server 16 is a database repository for digitised songs and related material such as artist information and pictures.

The purpose of the Nexus Server 16 is to:
a) guard the digital rights of its contents;
b) distribute the contents to the network making up the VMS system 10;
c) distribute its contents to Internet users;
d) collect new data from other Internet sites and databases and write these sites into databases;
e) check these downloaded databases against the data held in the Nexus Server database 142 and update its own database 142 where necessary;
f) construct new sites from this downloaded data;
g) ensure that that Nexus Server 16 is regularly registered on all Internet search engines;
h) keep in contact with all designated e-mails; and
i) find ways to improve all the above.

Each of the functions of the Nexus Server 16 are now described in more detail.

The Security Function.

The Nexus Server 16 is connected to the outside world via a hardware and software firewall. This hardware and software firewall 140 prevents unauthorised users from accessing the Nexus Server 16 and keeps out dangerous software viruses etc.

The Database.

The Nexus Server database 142 is a relational database divided into four separate sections in dependence on the type of information stored therein. The first section 164 called 'Customers', stores full details of all customers, purchases, web site accesses, last visited time and date, buying habits, times, address, previous address, credit-card type and information, e-mail, etc. The second section 165 called 'Songs' stores lists of songs, samples, associated graphics, associated text, links to similar songs, associated rights including coupling, copyright collection tune codes, Master Right details (record label, band, song length, writer, producer, composer) and additional details. The third section 166 called 'Accounts' stores accounts for customers, record labels, distributors, advertisers, credit-cards transactions, commissions, etc. The fourth section 167 called 'Metadata' stores web site design information, Internet downloads, other company databases, search engine results. The Nexus Server database 142 is ODBC (Open Database Connectivity) compatible.

The Internet Agent Function.

The Nexus Internet Agent 144 is a computer program that runs autonomously, collecting data and posting data. It is intelligent in its own right but is controlled by the AI function (object) 148. The Nexus Internet Agent 144 crawls the Internet 24 (it is known more commonly known as a Webcrawler) for data and works with the Mapper function (object) 150 to store this data in a structured manner. The Nexus Internet Agent 144 also works with the Database Miner function 146 to ensure that data held in the Nexus Server database 142 is constantly updated, maintained and questioned by data found on the Internet 24.

The Nexus Internet Agent 144 interrogates other search engines and web sites and, if necessary, works with the Web-Page Generator function 152 to create new Internet 24 pages and register them onto its own database 142 and other sites.

The Database Miner Function and the Artificial Intelligence Function.

The Database Miner function (object) 146 carries out an intelligent search of the Nexus Server database 142. It searches the different sections 164,165,166,167 of the database 142 using standard SQL (Structured Query Language) queries. Also searches can be carried out using the Artificial Intelligence function 148 where SQL searches are carried out on the results of intelligent pre-processing of the input data. In this embodiment, searches are carried out using phonetic, thesaurus, spell-checking, lifestyle type, and natural language processing (the Nexus Server tries to understand what you are searching for) pre-processing results. This AI function (object) 148 controls these more complex searches.

The following is an example of an Internet Agent and Database Miner currently in use. A well formed web page may have the following structure:

<META NAME="KeyWords" CONTENT="CDs, rock, pop, download, dance, music, country, folk, mp3, mpg, etc. etc.">

<META NAME="Description" CONTENT="CDs, rock, pop, download, dance, music, country, folk, mp3, mpg, etc. etc.">

<script language="JavaScript">

<!doctype html public "-//w3c//dtd html 4.0 transitional// en">

<html>

<head>

<meta http-equiv"Content-Type" content"text/html; charset=iso-8859-1">

<meta name="keywords" content="CDs, rock, pop, download, dance, music, country, folk, mp3, mpg, etcetc">

<meta name="Rating" content="Teenage">

<meta name="GENERATOR" content="Mozilla/4.5 [en] (Win95; I) [Netscape]">

<meta name="Author" content="Cerberus Central Ltd">

<meta name="description" content=" CDs, rock, pop, download, dance, music, country, folk, mp3, mpg, etc. etc. </title>

</head>

The Altavista Agent runs permanently writing the meta names, the meta name descriptions and some of the text on the page into a database (see above). The Agent collects this data autonomously and can understand a number of grammatical and natural spoken word statements. It tries to understand what is in the data it collects and uses this understanding to intelligently sort the same. This is achieved by using a number of language based algorithms.

When Altavista is searched, a Data Miner is invoked which tries to understand what you are looking for and then looks at the database. It uses the text that you typed into it and its understanding of that text to return to you a number of results. However, this is only a very basic function which does not provide a significant improvement over the straight searching.

Figure 11:
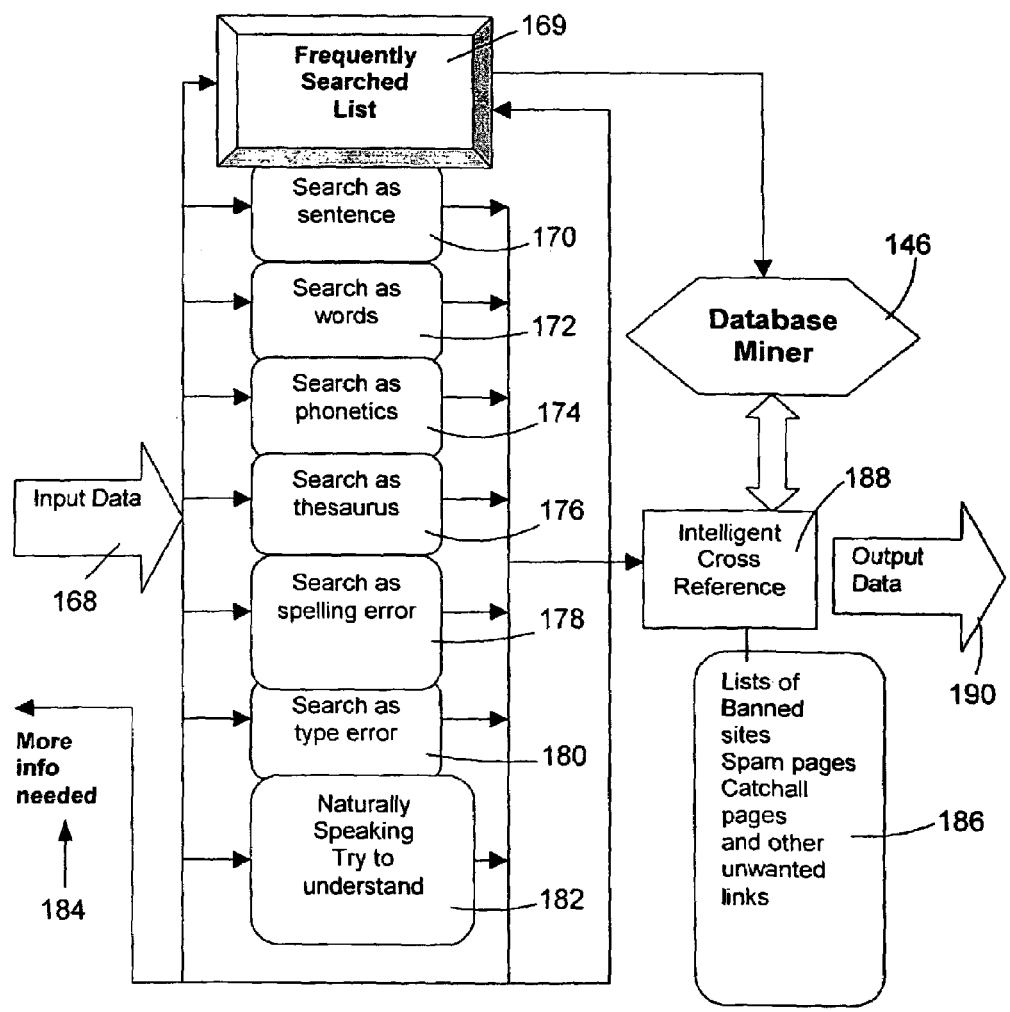
FIG. 11 is a schematic block diagram illustrating the operation of the Nexus AI Interpreter shown in FIG. 10.

Referring now to FIG. 11 the operation of the Nexus Artificial Intelligence function (Object) 148 is now described. The Nexus Artificial Intelligence function 148 interprets the input data 168 as set out below.

If input data 168 is on the frequently searched list 169 then the correct search data is sent to the Database Miner function 146 for retrieval form the Nexus Server database 142. Simultaneously, the AI function 148 carries out a set of pre-search processing steps in an attempt to work out what should be searches assuming that the input data 168 is not on the frequently searched list 169. Each of the different pre-search processing steps is described below.

1) Search as sentence 170. Instances of the input data 168 as sentences are searched.

2) Search as words 172. Instances of the input data 168 as individual words are searched.

3) Search as phonetics 174. Instances of the input data 168 as phonetic sounds are searched.

4) Search as thesaurus 176. Instances of data with similar meanings to the input data 168 are searched.

5) Search as spelling error 178. Instances of the input data 168 with known spelling errors are searched.

6) Search as typing error 180. Instances of the input data 168 with known type errors are searched.

7) Naturally Speaking Try to understand 182. The meaning of the input data 168 is studied and the appropriate search criteria are generated.

If there is not enough information in the input data 168 to carry out these pre-search processing steps, then the AI function 148 can request for more information at 184.

Each of the pre-search processing steps generates alternative searchable data which is sent to the frequently searched list 169. If the frequently searched list 169 does not find a match with the input data 168, the alternative searchable data is sent to the Database Miner function 146.

In response to either type of search request, the Database Miner function 146 returns its search results. Any Internet links found are checked against a list 186 of sites/pages that are not approved, for example banned Internet sites, spam pages, and Catchall pages. All the approved data is intelligently cross referenced at 188 with the original search criteria generated by the AI function 148 and an output 190 is generated.

By following the above interpreting process, the Nexus Server 16 forms an intelligent database and interpreter which is superior to any other present Internet search engine or portal.

The Mapper Function.

The mapper function (object) 150 enables various Internet (web) page and search engine results to be mapped to a database structure linking different data types and positions to different data fields.

The Web Page Generator Function.

This function (object) enables web pages to be constructed from the Nexus Server database 142. These pages can be used to build the Nexus Server's own Internet site or be registered onto other Internet sites.

The E-Mailer Function.

This function (object) 154 is an automatic e-mailer. It keeps the customer up-to-date with what is happening on the Nexus Server 16 such as new releases, special offers, etc.

It is also a powerful marketing tool and can be used with the Nexus Internet Agent 144 to collect e-mails of any desired type such as e-mails of journalists, competitors etc.

The Publisher Function.

The publisher function (object) 156 enables other companies and individuals to publish their material onto the Nexus Server 16 in a controlled manner. It enables, for example, record labels to upload their songs, graphics and text onto the Nexus Server 16 and receive all the relevant contracts and information.

The SDMI Encryption and Watermarking Function.

This function (object) 158 carries out encryption of data. Also specific digital data identifiers (watermarks) can be embedded within the data for authentication purposes. This function 158 enables the Nexus Server 16 to:

a) comply with the SDMI specification;

b) encode songs uniquely to a user so only that user can play them back;

c) watermark Red Book audio, MP-3 or any other audio format; and d) protect, control and track copyright usage.

The Credit Card and Banking Function.

The credit card and banking function (object) 160 enables credit cards to be cleared on-line. It also manages the Nexus Server's bank account and accesses customers' account details. This function 160 uses standard on-line credit-card clearance software.

The EDI Function.

The EDI function (object) 162 manages the Nexus Server's inventory and generates sales reports of Copyright Collection Agencies and Record labels. Reports are generated in an MCPS annex B type approved record sale report.

The Network Manager Function.

The Nexus Server 16 feeds its kiosks (VMS Headsets 12) via the satellite network 28. It is also connected to the Internet 24 and directly to banks of modems for other customers. The modem bank gives users direct point-to-point access to the Nexus Server 16 at full modem bandwidth (far greater than that for the Internet 24). The flow of information into and out of the Nexus server is controlled by the Network Manager function 163.

In a second embodiment of the present invention, a further level of the AV database is displayed on the VMS Headset GUI 50. This is of particular use when two select grids 60 are required to be displayed. For example, if a first select grid contained information relating to the type of AV data e.g. Audio music tracks, music videos, films etc., then the second select grid could also show the categories within a selected area say styles of audio music or in the case of films, types of film. Selection of each style option would generate its own data its Results Grid as in the first embodiment. All the other features of the VMS Headset GUI 50 in the first embodiment would be provided in this second alternative embodiment.

Figure 12:
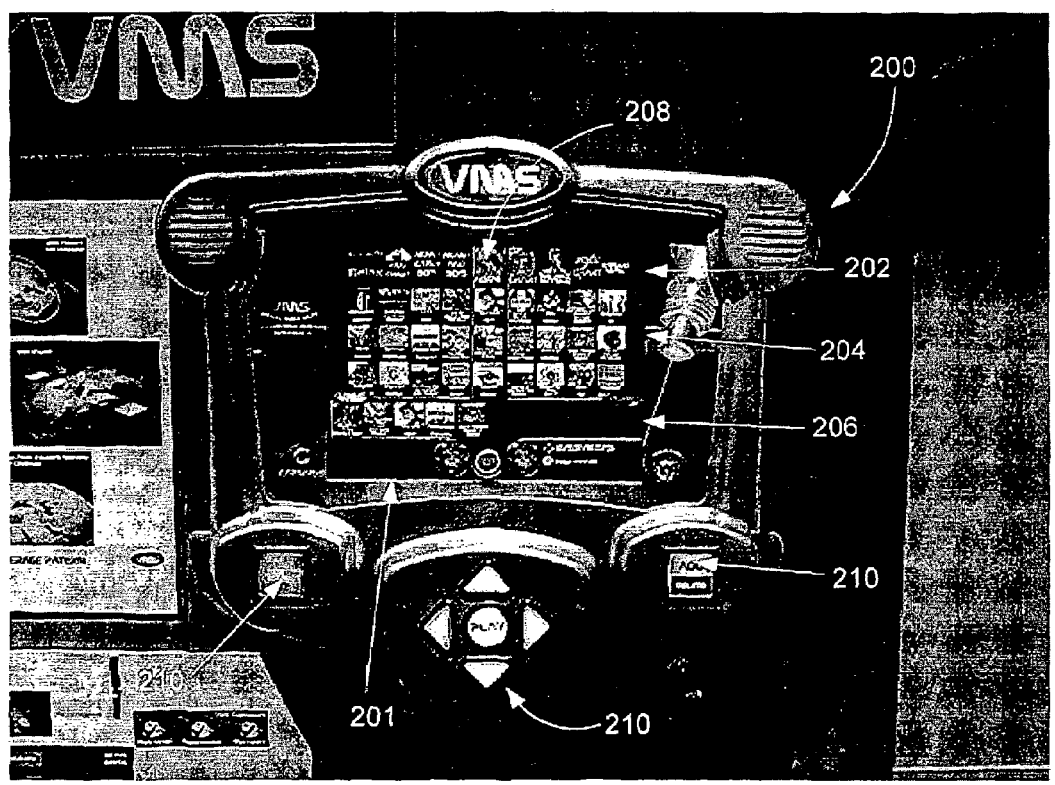
FIG. 12 is a front view of a VMS Headset incorporating a VMS Headset GUI according to a third embodiment of the present invention.
Figure 13:
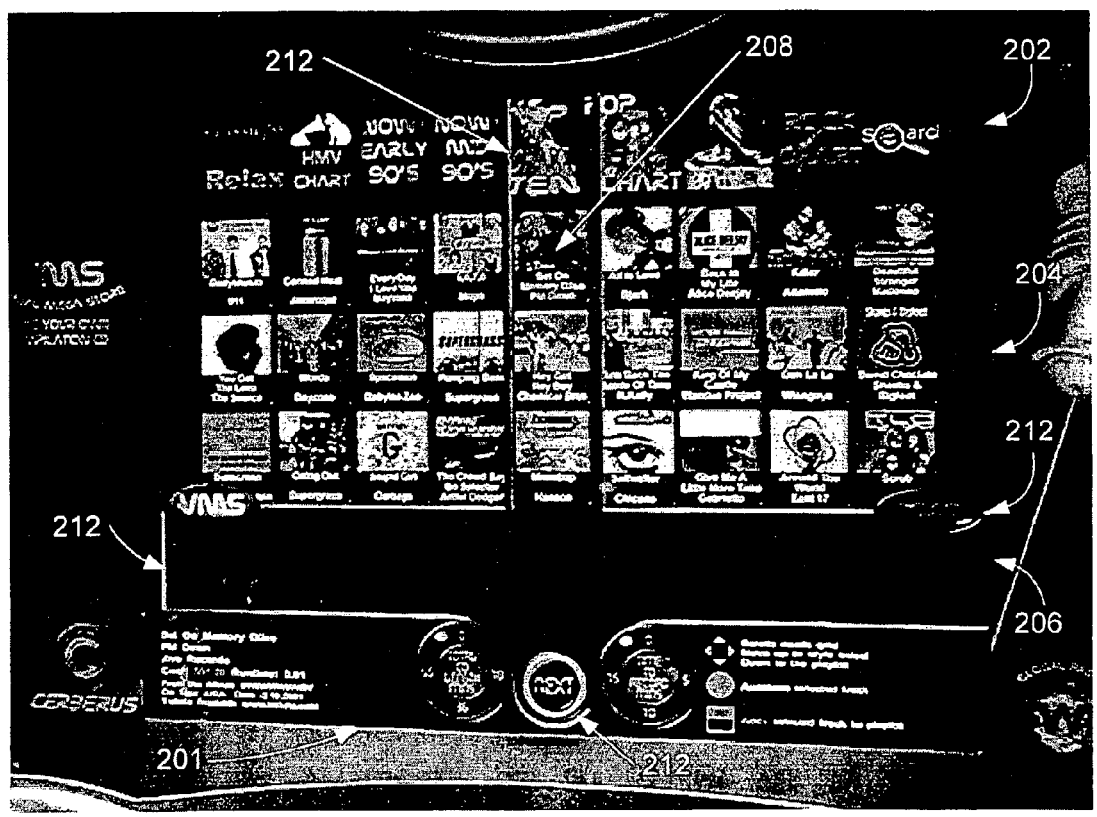
FIG. 13 is a detailed view of the VMS Headset GUI of FIG. 12 showing the GUI at an initial stage of its use with no items selected in the chosen songs list.

A third embodiment of the present invention is now described with reference to FIGS. 12 to 21. The third embodiment comprises a modified VMS headset incorporating a modified VMS Headset GUI for use in selecting and creating a chosen songs list. Referring now to FIGS. 12 and 13, the VMS Headset 200 of the third embodiment has many similarities to the VMS Headset 12 described in the above. Accordingly, the present description will be restricted to the differences between the first and third embodiments.

In the third embodiment, the VMS Headset 200 comprises a VMS Headset GUI 201. The VMS Headset GUI 201 is presented on screen as a Select Grid 202 (used to select genres, styles, search etc.), a Results Grid 204 (used to display sub genre, styles, and search and songs) and a Chosen Songs Grid 206 (used to display the songs selected by the customer).

A screen cursor 208 is provided which is movable by way of arcade-game push buttons 210. The movement of the cursor 208 is limited to within a region bounded by a cross-shaped movement tube 212. The tube 212 covers the Select Grid 202, the Results Grid 204 and the Chosen Songs Grid 206. The limited movement of the cursor, to within the region bounded by the tube 212, advantageously provides an improved level of certainty for the customer particularly when the customer is using the GUI 201 for the first time. This reduces the time taken to understand how the GUI works and hence the overall CD compilation and recording time.

Each grid 202, 204, 206 is provided with a plurality of images (graphics) which are each linked to a specific action (play, move etc.). An action is evoked by placing the cursor 58 over an image and selecting it. The selection of an image from the Select Grid 202 simply drops the cursor 208 within the tube 212 into the Results Grid 204. Selection of an image from the Results Grid 204 creates a screen copy of the image in the Results Grid 204 and causes the copy image to move within the tube 212 to the Chosen Songs Grid 206. The copy image is placed at the leftmost free location within the Chosen Songs Grid 206. The customer can then move the cursor over another image in the Results Grid 204 or even move onto another set of images by moving the cursor into the Select Grid 202 and selecting a different image therein.

Figure 14:
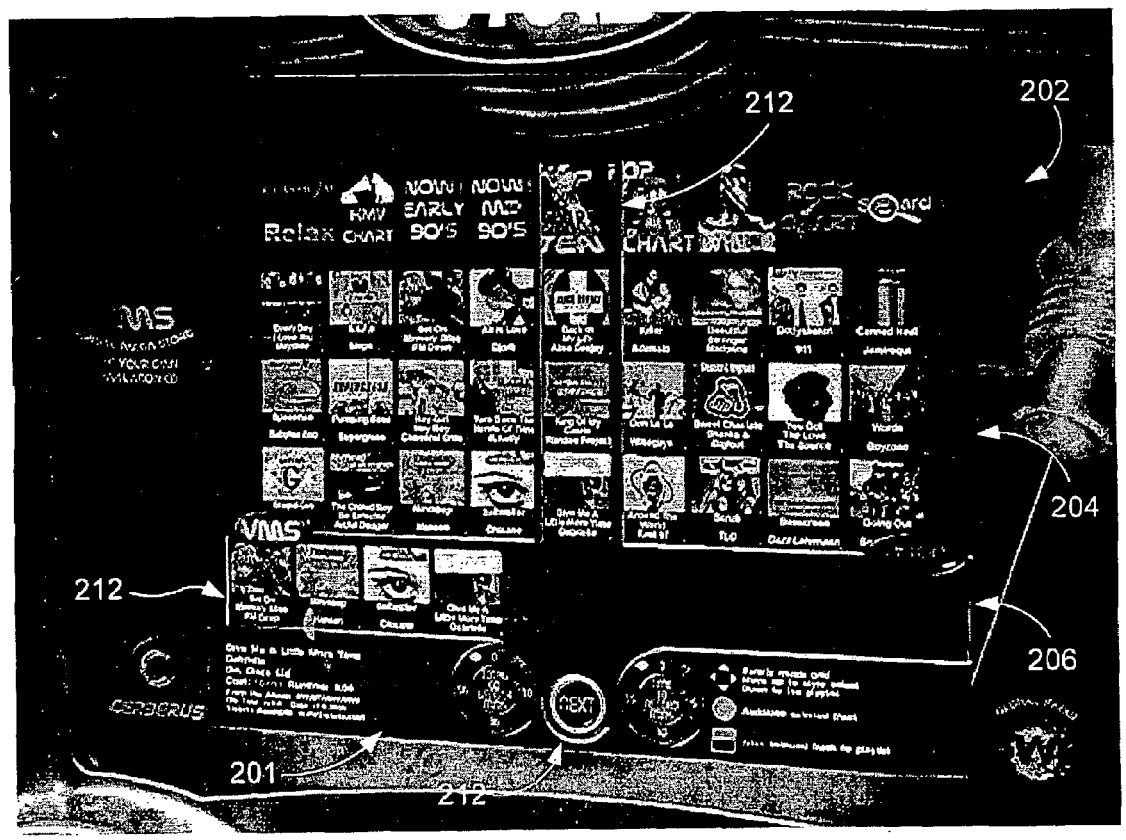
FIG. 14 is a detailed view of the VMS Headset GUI of FIG. 12 showing the GUI at an intermediate stage of its use with four items selected in the chosen songs list.

This process can be repeated for each desired song which is to be added to the Chosen Songs Grid 206 until the desired compilation is achieved. FIG. 14 shows an intermediate stage where four records have been chosen and added to the Chosen Songs Grid 206.

Figure 15:
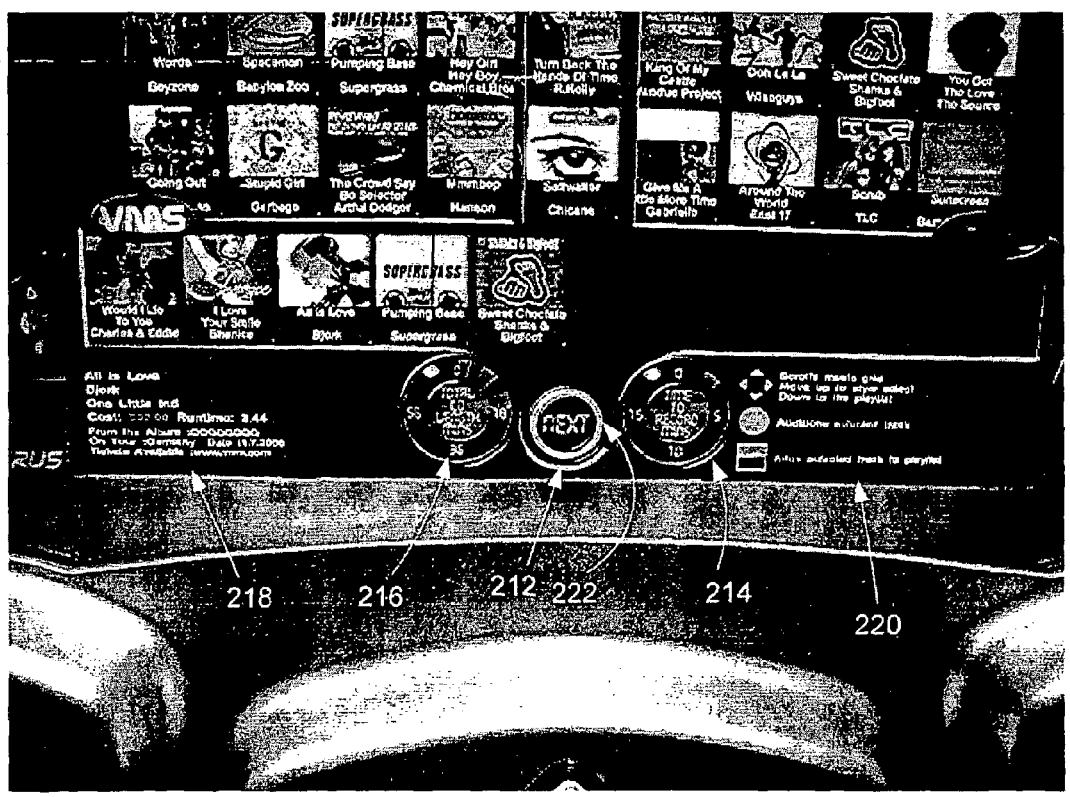
FIG. 15 is a close up detailed view of the VMS Headset GUI of FIG. 12 showing recording time dials and other track selection details.
Figure 16:
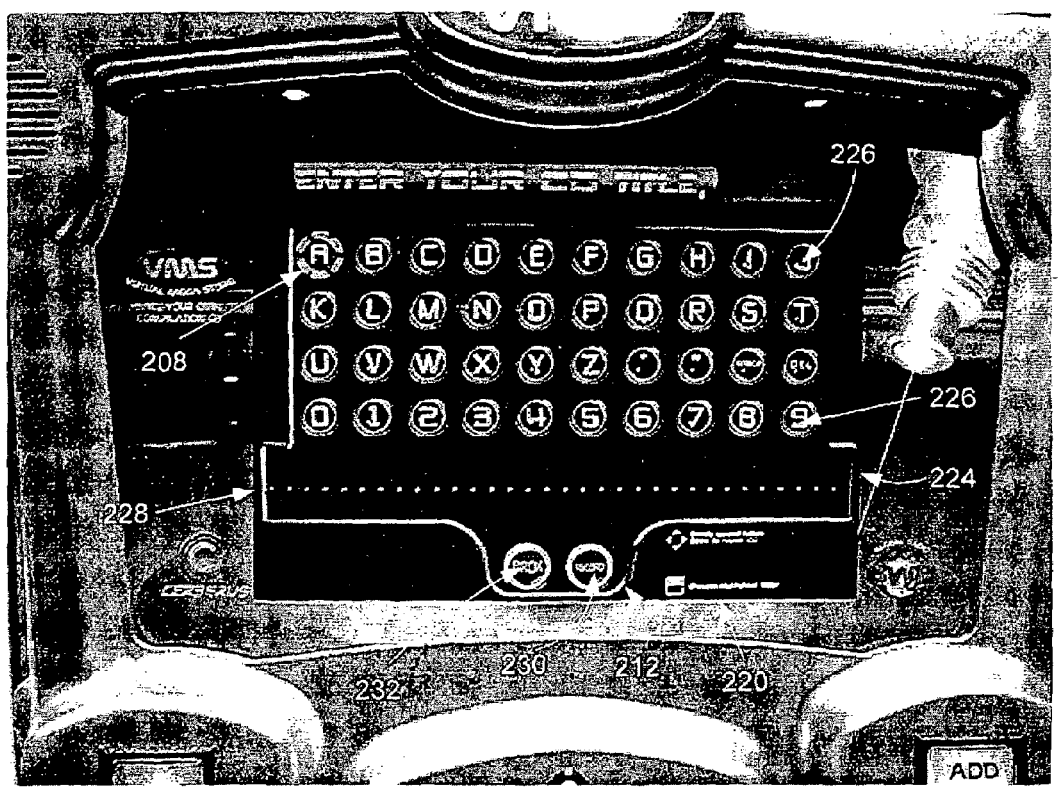
FIG. 16 is a detailed view of the VMS Headset GUI of FIG. 12 showing a composition labelling facility screen.

Referring now to FIG. 15, additional features of the VMS Headset GUI 201 are now described. The GUI 201 includes two time dials 214, 216 which respectively display useful timing information about the length (running time) of the current CD track and the total length of the CD to be recorded containing all the selected tracks.

Moving the cursor 208 over a each different image in the Results Grid 204 automatically updates the time dial 214 showing the length of the current track. Once a track is selected, its running time is added to the total length time dial 216. Similarly, removal of a selected track from the Chosen Songs Grid 206 will reduce the time displayed on the total length time dial 216.

The GUI 201 also displays supplemental information 218 regarding a track currently indicated by the cursor 208. The supplemental information indicates the name of the track, the album, the artist, the cost, the runtime, tour information and ticket availability information. As the cursor 208 is moved over a new track image, the supplemental information 218 is updated automatically.

A key 220 of icons is also provided on the GUI 201 for identifying the operations performed by each of the arcade push buttons 210. The key 220 is adaptive in that it only displays icons and corresponding information regarding live arcade push buttons 210. Accordingly, when the GUI 201 is in a mode where some of the arcade push buttons 210 would temporarily have no effect on the operation of the GUI 201, then the icons and corresponding information for these push buttons 210 are not displayed (see FIG. 16 for example).

The GUI 201 also comprises a Next Screen Button 222 which is provided within the tube 212. The Next Screen Button 222 is used by the customer when he or she has completed the selection of desired tracks for recording. When the customer selects the Next Screen Button 222, this takes the customer away from the track selection options into a CD Title Screen 224, shown in FIG. 16.

In the CD Title Screen 224, the customer is presented with a collection of alphanumeric character buttons 226 together with the cursor 208. Movement of the cursor 208 and character selection is possible as before by use of the arcade push buttons 210. Each character selection, creates a representation of that character in a title field 228 within the tube 212 which is also provided on this screen 224. In this way, the customer can immediately see the title which is to be applied to the CD as it is being constructed.

Once the title has been constructed, the customer can proceed with recording the previously selected track compilation by selecting a record button 230. The customer is given one final chance to confirm that they do indeed wish to proceed with the recording of the current track selection. If the procedure is confirmed, then the recording procedure commences and the selected tracks become the selected songs list that are to be recorded.

If the customer does not confirm the track selection then they are brought back the CD Title Screen 224. From here the customer can get back to the track selection options provided on the initial screen of the GUI 201 by selecting a Back Button 232.

Figure 17:
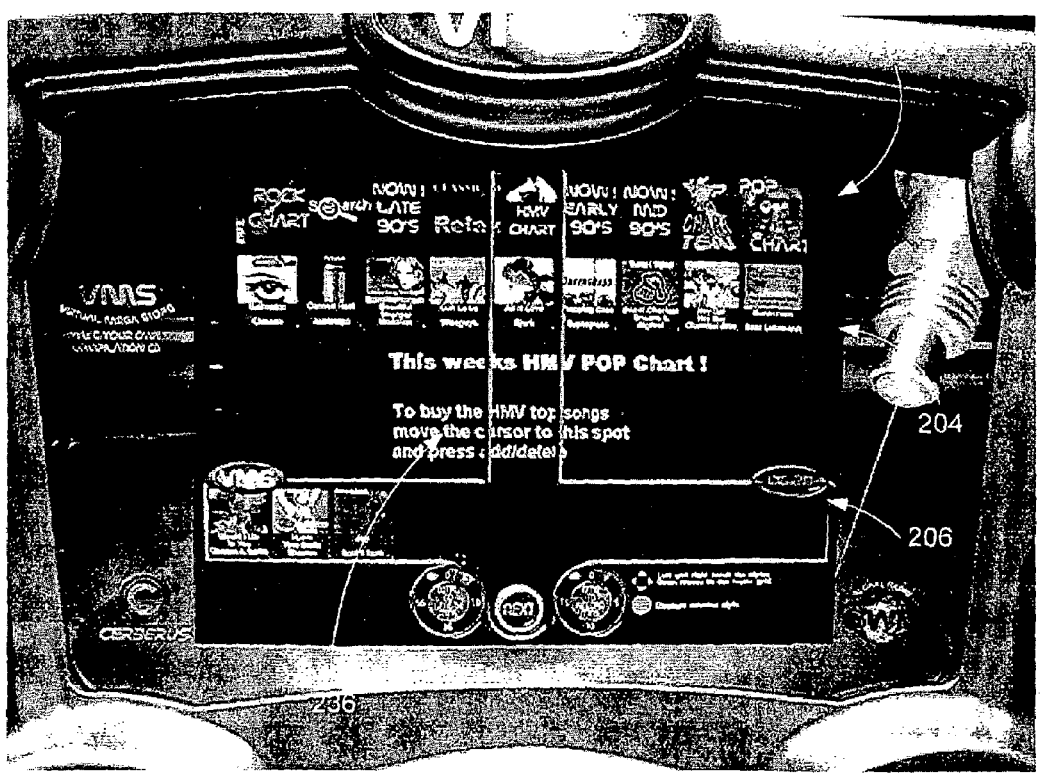
FIG. 17 is a detailed view of the VMS Headset GUI of FIG. 12 showing the GUI providing a multiple addition facility.
Figure 18:
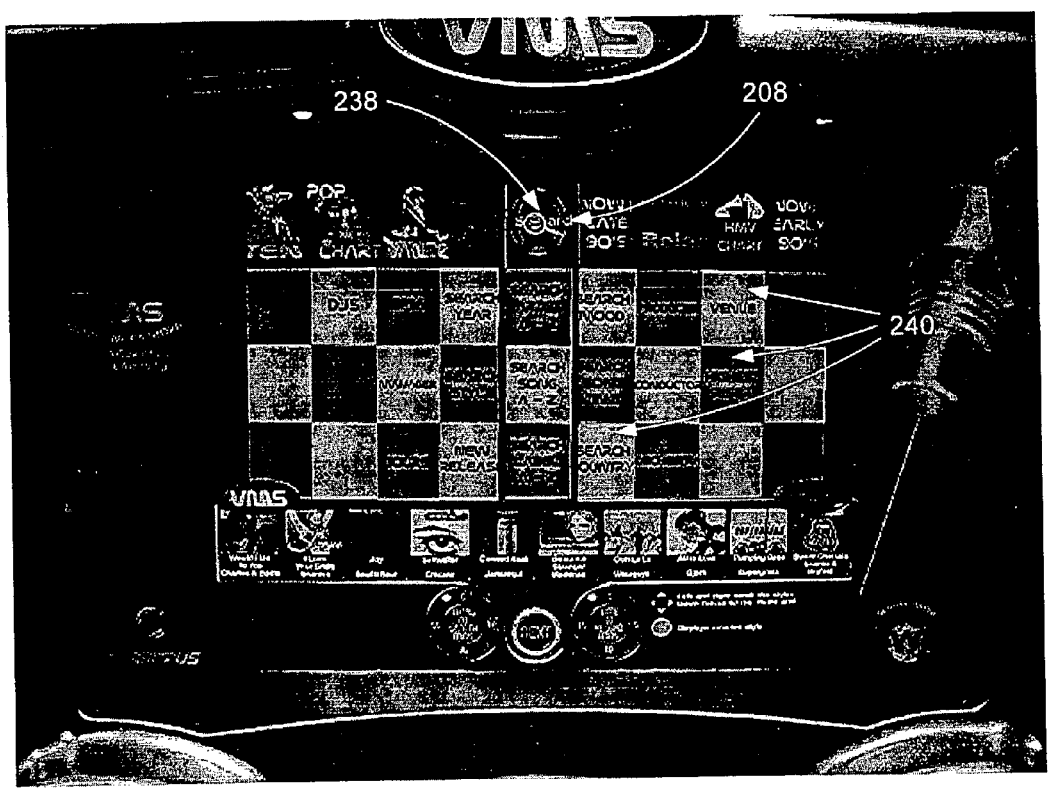
FIG. 18 is a detailed view of the VMS Headset GUI of FIG. 12 showing a first page of a search facility.
Figure 19:
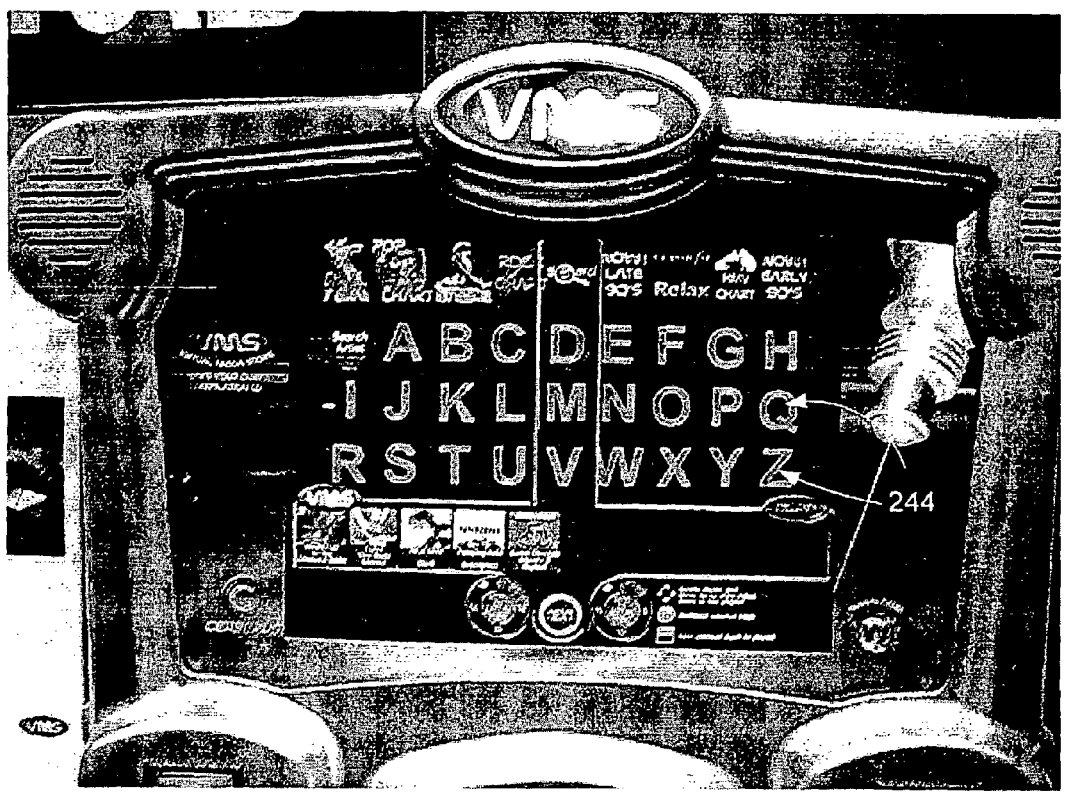
FIG. 19 is a detailed view of the VMS Headset GUI of FIG. 12 showing a second page of a search facility.
Figure 20:
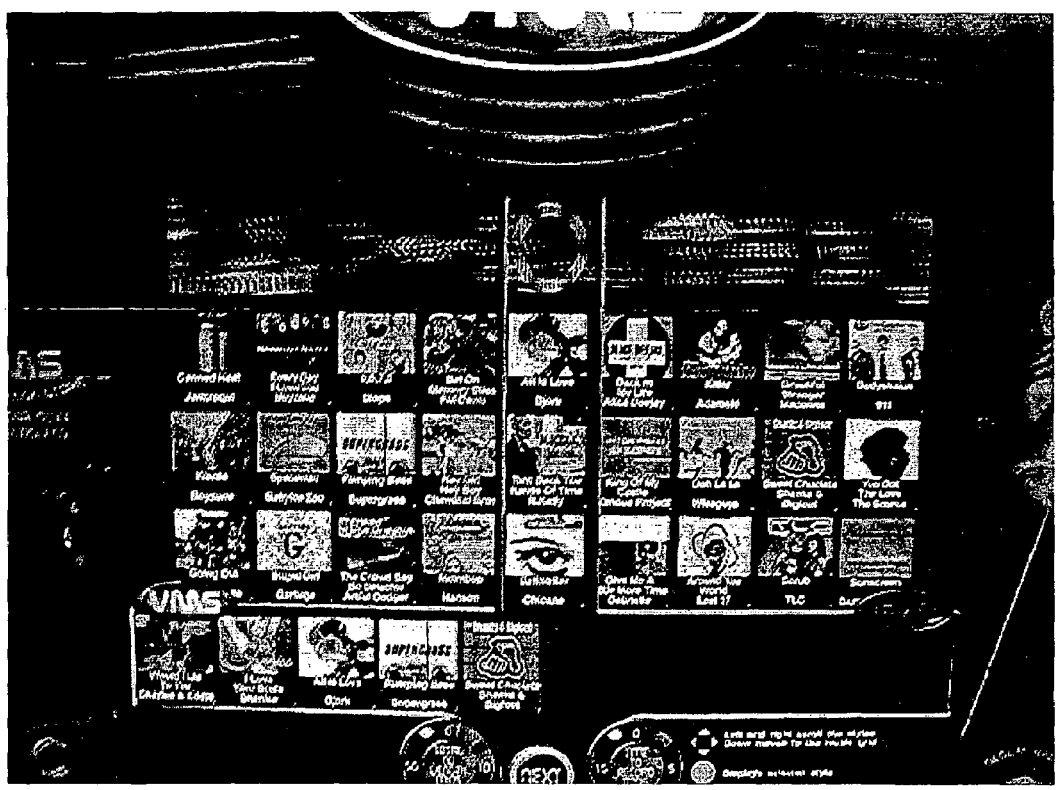
FIG. 20 is a detailed view of the VMS Headset GUI of FIG. 12 at an intermediate stage of its use showing the option of fast scanning the Select Grid for the appropriate style or genre.
Figure 21:
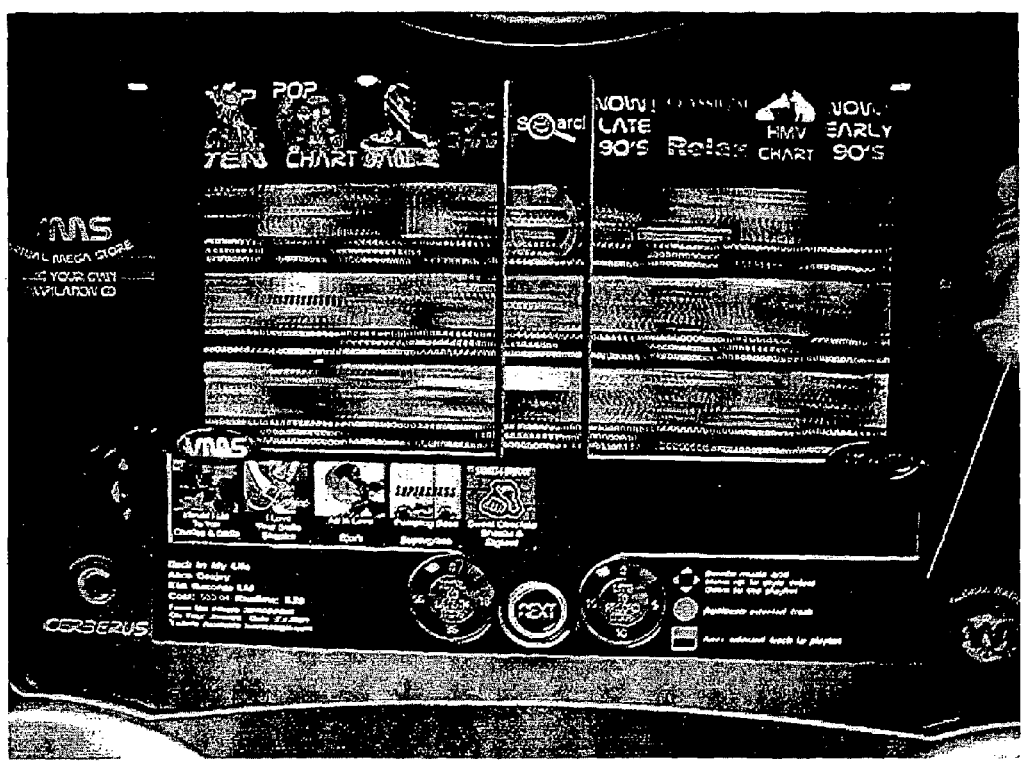
FIG. 21 is a detailed view of the VMS Headset GUI of FIG. 12 at an intermediate stage of its use showing the option of fast scanning the Results Grid for the appropriate group of selectable song titles within the selected genre.

Referring now to FIGS. 17 to 19, two other specific features of the third embodiment are now described. The first feature concerns the selection of predetermined groups of tracks by a single action. The VMS Headset GUI 201 is arranged when accessing a chart option 234 from the Select Grid 202, to provide the customer with the option of selecting the top ten tracks of the chart for example. The option is selected by the customer moving the cursor 208 over a customer selectable portion 236 of the Results Grid 204 and selecting this by use of the arcade push buttons 210 (see FIG. 17). This causes ten images representing the top ten tracks to be copied and then dropped down into the Chosen Songs Grid 206. If there is no space left in the Chosen Songs Grid 206, then the customer is asked to delete tracks from the Chosen Songs Grid 206 to accommodate the new additions. This option enables customers with predetermined requirements for their selection to be accommodated and also acts to speed up the entire selection process.

FIG. 18 shows the second specific feature of the third embodiment. The VMS Headset GUI 201 is arranged when accessing a search option 238 from the Select Grid 202, to provide the customer with different types of search options 240 in the Results Grid 204. Selection of one of the search options 240 in the Results Grid 204 generates a Search Enquiry Screen 242 as shown in FIG. 19.

In the Search Enquiry Screen 242, the customer is presented with a collection of alphanumeric character buttons 244 together with the cursor 208. Movement of the cursor 208 and character selection is possible as before by use of the arcade push buttons 210. Each character selection, executes a search with the results being presented back in the initial screen of the GUI in the Results Grid 204. From here the customer can select the desired track as had been described before.

This search facility enables the customer to access enormous quantities of data relatively simply and is particularly useful when the VMS Headset accesses a large remote database of songs at the Nexus Server.

Relative movement between the cursor 208 and the different images representing different songs/tracks is achieved by retaining the cursor 208 in the middle of the screen at all times and shuffling the rows of images in either the Select Grid 202 or the Results Grid 204 in response to a left or right arrow push button activation by the customer. If the left or right arrow key 210 is kept depressed, a high-speed shuffling occurs in either the Select Grid 202 or the Results Grid 204 as is shown respectively in FIGS. 20 and 21. This advantageously enables the customer to have fast access to different images (options) which may be spaced apart by relatively large numbers of images and enables the number of choices in each category to be increased without undue burden on the customer in terms of time taken to create a compilation and ease of use.

A fourth embodiment of the present invention is now described. The fourth embodiment is similar to the third embodiment except for the fact that it comprises an additional Customer Recognition and Greeting Module for use in promoting use of the VMS system and providing more intelligent customer interaction.

The Customer Recognition and Greeting Module of the fourth embodiment is arranged to utilise information from a magnetically operated banking card, namely a card having a data carrying magnetic stripe. Each magnetically operated banking card contains three tracks of information (like audio tracks on a cassette). Track 2 contains information about the customer (including their name and credit card no).

The Customer Recognition and Greeting Module of the VMS system, which is located at the VMS Headset, comprises a magnetic card reader and is configured to read Track 2 to obtain the customer information. Once the customer information has been read it can be stored in a customer database for a new customer. The database is provided at a location where it can be accessed by all the networked VMS Headsets. Typically this is at the VPP Server.

For customers who have used the VMS system previously, the Customer Recognition and Greeting Module associates the customer information read from the card with the corresponding customer details that already exist in the customer database. In other words, the VMS system has the ability to recognise the customer if he or she has used the system before.

The object of the Customer Recognition and Greeting Module of the VMS system is to provide targeted information for promoting further sales. The way in which this is achieved is set out in a flow diagram shown in FIG. 22.

Figure 22:
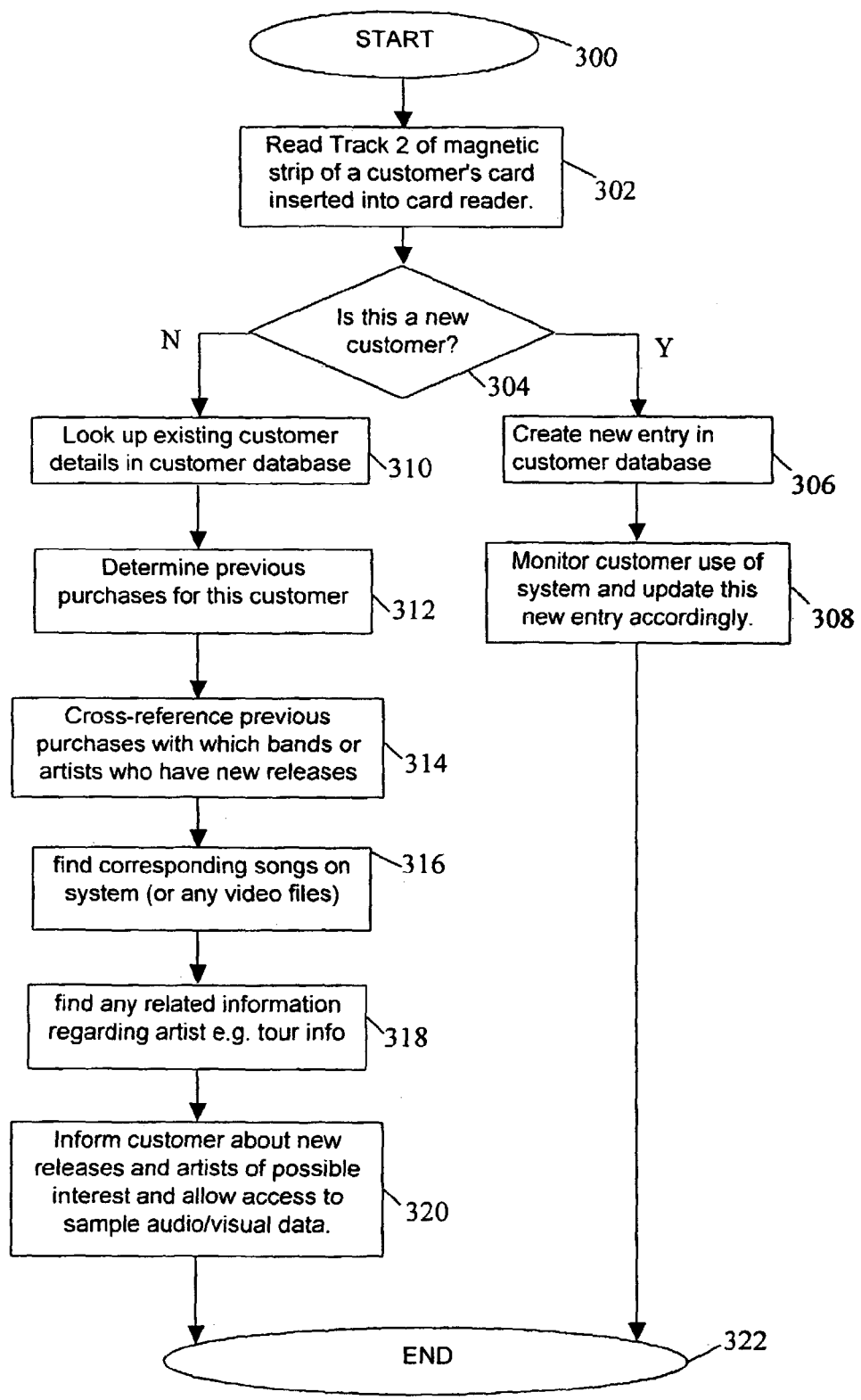
FIG. 22 is a schematic flow diagram showing the operation of a Customer recognition and greetings module of the VMS headset of the fourth embodiment.

Referring to FIG. 22, the process starts at 300 with the monitoring of the card reader. When a card is swiped through the reader, Track 2 of the magnetic stripe containing the customer's details is read and the customer information is extracted at 302. The extracted information is compared at 304 with a list of existing customers held at the VMS Headset. If there is no corresponding entry in the list, the current customer is a new customer and a new entry is created at 306 in the database as well as in the list of existing customers. Then the customer's use of the VMS system is monitored at 308 and any preference information, together with a list of current purchases, is used to update the newly created record in the customer database.

If, on the other hand, the read information indicates that this is an existing customer (by a match being found in the existing customer list), then the existing customer details are retrieved at 310 from the customer database. Previous purchases for this customer are considered at 312 from the retrieved record for the customer and they are cross-referenced at 314 with any bands or artists who have new releases. Then at 316 songs or any video files corresponding to the cross-referenced bands/artists are found. Also any related information regarding the artists/bands is found at 318 such as tour information (dates, locations, ticket information). Finally, the customer is informed at 320 about the new releases from artists who may be of interest to him or her as well as the related information (tour dates) regarding that artist. The presentation of this information completes the function of the Customer Recognition and Greeting Module at 322.

The new artist information is provided in two ways. Firstly, a voice synthesis module is used that talks to the customer directly. This module artificially generates an audio representation of the customer name by use of a naturally speaking algorithm. Secondly, all the audio and visual files relating to the new releases and ancillary information are provided for presentation to the customer. In this way, the customer has the option of sampling the new releases and related information prior to making any commitment to purchase any new item.

The object of this is to provide the customer with information regarding new material which is specifically aimed at their personal preferences. This limits the amount of information that the customer is presented and makes the provided information more likely to be of interest.

An example of how the VMS Headset GUI interacts with the customer to present the new information is given below.

Lets say that 'Shak' comes to the VMS system (VMS Headset) and either uses his own credit card or has a special VMS membership card. Shak walks up to the headset and swipes his card in the card reader slot provided. The VMS Headset GUI then says:

"Hey Shak Man, where have you been, last time you bought a record was weeks ago!"

"Got some great music since you were last here, remember the band XXX whose single you bought last time, well there 'doin' it again, with a real 'stoppin' track, YYYY ZZZ HHH, and its 'ripin' its way through the chart."

"Would you like to hear it? YES/NO"

"Would you like to see them live? YES/NO"

The rest is a pre-programmed greeting with a variable generator so it is a slightly different greeting is generated each time a customer visits the VMS system.

Whilst the fourth embodiment of the present invention has been described in connection with a magnetically operated banking card such as a credit/store card, it is to be appreciated that other types of standard portable data stores can also be utilised. For example, smart cards can be used with an appropriate smart card reader being provided as part of the Customer Recognition and Greeting Module.

Referring now to FIGS. 23, 24 and 25, a fifth embodiment of the present invention is now described. The fifth embodiment is similar to the third embodiment and hence only the differences will be described hereinafter.

The main difference of this embodiment relates to the three-dimensional nature of the GUI shown in FIGS. 23 to 25. More specifically, referring to FIG. 23, the GUI is arranged to not only move the cursor across the screen in the X and Y co-ordinates, but also to move graphical images in the Z co-ordinate direction, namely towards and away from the viewer of the GUI screen. In one simple form, this Z co-ordinate movement is similar to zooming into and out of a selected graphical image. However, as is described below, this is a truly independent three-dimensional movement which is not restricted to simple movements such as zooming into and out of a graphical image.

FIG. 23 shows a modified VMS Headset GUI similar to that of the third embodiment. As before there is a select grid and a results grid together with a chosen songs grid. However, in this embodiment there is a difference in the size of the graphical images, namely those stored in the chosen songs grid are smaller than those of the select grid and the results grid. On selection, two visual effects occur concurrently. Firstly, the viewing distance to the selected graphical image is reduced thereby giving the appearance of the graphical imaged having been lifted out of the plane of the other graphical images. At the same time the size of the selected graphical image is reduced to fit the size of the smaller chosen songs grid. Accordingly, even though the graphical image has a reduced viewing distance, it is smaller in size.

The selected image is then moved downwards and across to the next available position in the chosen songs grid. Once the selected graphical image has reached its desired new X,Y co-ordinate location, there is no need to change the viewing distance as in this embodiment the chosen songs grid is deemed to be at the lifted up level of the selected image.

However, it is also possible for the image to be simply increased in size by having a reduced viewing distance, then floated over the other graphical images to its new location and finally decreased in size to fit the appropriate size of the chosen songs grid. In this case, all three of the select grid, the results grid and the chosen songs grids are in the same graphical plane.

This GUI in this embodiment, it is possible on selection of a graphical image for an action associated with that image to be activated in conjunction with an enhanced three-dimensional visual effect. For example, if the video file associated with an AV record is to be displayed, this can be done so in a frame which appears to come toward the user (a reduction of the Z co-ordinate) to maximise the viewing area for the video on the viewing screen. This enlargement feature can also be used for closer examination of the graphical image which makes up the AV record identifier, typically an single or album sleeve cover.

The three-dimensional nature of the fifth embodiment is also seen in other parts of the GUI. For example, referring to FIGS. 24 and 25, two different scenes of an initial operating page of the GUI are shown. In FIG. 24, animated doors of the GUI are shown in a closed position and in FIG. 25 the animated doors are shown in an open position with three different AV record recordal options being visible. The doors open up towards the viewer such that the movement appears to the user as three-dimensional movement between these positions. However, the whole screen is not zoomed into. Rather, only the movement of the doors appears to be towards the viewer's position.

Such three-dimensional movement greatly enhances the attraction of the GUI and ensures that the users remains interested throughout the AVDDM record selection and recordal process. In fact, while one AVDDM is being recorded, the user can be compiling another one or can allow another user to compile their own selection.

It is to be appreciated that the features of the different embodiments are not mutually exclusive and can readily be interchanged between embodiments. For example, the Customer Recognition and Greeting Module of the fourth embodiment can easily be applied to each of the other embodiments. Further, as stated above, the three-dimensional nature of GUI of the fifth embodiment is readily applicable to each of the other four embodiments even though it has not been explicitly described in any of these embodiments.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example, whilst the above embodiments have utilised arcade-game push buttons as part of the VMS Headset GUI 50, it would be possible to replace these with a touch screen in which the user selects options by simply touching the screen. Also, whilst the above described embodiments distribute audio AV files, it would be possible for this to be substituted by video AV files. Such video files could even be supplied in conjunction with audio files of the distribution of music videos and movies. Recordal of such videos and movies could be provided on DVDs for example.

The invention claimed is:

1. A method of quickly and securely recording a selected digitally encoded AV (Audio/Video) data record from a first digital data store to an AVDDM (Audio/Video Distributable Data Medium) which enables the AV data record to be read on more than one device, the method comprising the steps of:
   (a) reading a discrete portion of the selected AV data record from the first digital data store;
   (b) digitally decoding the read discrete portion of the selected AV data record subsequent to the reading step;
   (c) storing temporarily the decoded discrete portion of the selected AV data record that has been read from the first digital data store, into a second digital data store;
   (d) transferring the read decoded discrete portion from the second store to an AVDDM recorder;
   (e) recording the read decoded discrete portion onto the AVDDM; and
   (f) sequentially repeating the steps (a) to (e) for each discrete portion of the selected AV data record until all the portions of the selected AV data record have been recorded onto the AVDDM, wherein at least the storing and recording are carried out simultaneously for different discrete portions of the selected AV data record.

2. A method according to claim 1, further comprising the processing step of:
   generating a feedback signal when the AVDDM recorder has finished recording the read decoded discrete portion and wherein, for each portion of the selected AV data record, the processing steps are carried out asynchronously on the basis of the feedback signal.

3. A method according to claim 1, wherein the transferring step is also carried out simultaneously with the storing and recording steps for a discrete portions of the selected AV data record different to those being handled by the storing and recording steps.

4. A method according to claim 1, wherein the storing step is carried out sequentially with the recording step and within the time taken to complete the recording step.

5. A method according to claim 1, further comprising selecting an AV data record to be recorded from the first digital data store prior to commencing the reading step.

6. A method according to claim 1, wherein the first digital data store comprises a database of AV data records, and the method further comprises selecting a plurality of AV data records from the database prior to commencing the reading step, each of the plurality of AV data records being read and recorded individually by the method.

7. A method according to claim 1, wherein the AV data record is in a format unsuitable for recording onto the AVDDM and the method further comprises converting the read discrete portion of the selected AV data record into an AVDDM format prior to the recording step.

8. A method according to claim 1, further comprising processing the discrete read portion of the AV data record prior to the temporarily storing step.

9. A method according to claim 8, wherein the processing step comprises applying a digital copyright notice to the AV data record to be recorded.

10. A method according to claim 8, wherein the processing step comprises adding a digital data watermark to the AV data record to indicate the authenticity of the recorded copy.

11. A method according to claim 1, further comprising checking the format of the AVDDM once it has been recorded with the selected AV data record.

12. A method according to claim 1, further comprising recording a table of contents onto the AVDDM once it has been recorded with the selected AV data record.

13. A method according to claim 1, wherein the method is operable under the control of a host operating system.

14. An apparatus for quickly and securely transferring an AV (Audio/Video) data record selected from a first digital data store to an AVDDM (Audio/Video Distributable Data Medium) which enables the AV data record to be read on more than one device, the apparatus comprising:
   first transfer means for reading a discrete portion of the selected AV data record from the first digital data store and temporarily storing the same in a second digital data store;
   a decoder for decoding the read discrete portion of the selected AV data record;
   second transfer means for transferring the read discrete decoded portion from the second digital data store to the AVDDM recorder; and
   an AVDDM recorder for recording the read discrete portion onto the AVDDM, wherein the apparatus is arranged to repeatedly operate the first transfer means, the decoder, the second transfer means and the AVDDM recorder to transfer each discrete portions of the selected AV data record a portion at a time from the first digital data store to the AVDDM until all of the portions of the selected AV data record have been recorded onto the AVDDM and to operate the first transfer means and the AVDDM recorder simultaneously on different discrete portions of the selected AV data record.

15. An apparatus according to claim 14, wherein the AVDDM recorder is arranged to generate a feedback signal when it has finished recording the read decoded portion; and the apparatus is arranged to effect each part of the transfer asynchronously on the basis of the feedback signal for each portion of the selected AV data record.

16. An apparatus according to claim 14, wherein the apparatus is arranged to operate the second transfer means simultaneously with the first transfer means and the AVDDM recorder for a discrete portions of the selected AV data record different to those being handled by the first transfer means and the AVDDM recorder.

17. A method of quickly and securely recording a selected encoded AV (Audio/Video) data record from a first digital data store to an AVDDM (Audio/Video Distributable Data Medium) which enables the AV data record to be read on more than one device, the method comprising the steps of:
   (a) reading a discrete portion of the selected AV data record from the first digital data store;

(b) decoding the read discrete portion of the selected AV data record subsequent to the reading step;

(c) storing temporarily the decoded discrete portion of the selected AV data record that has been read from the first digital data store, into a second digital data store;

(d) transferring the read decoded discrete portion from the second digital data store to an AVDDM recorder;

(e) recording the read decoded discrete portion onto the AVDDM;

(f) generating a feedback signal when the AVDDM recorder has finished recording the read discrete portion; and (g) sequentially repeating the steps (a) to (f) for each discrete portion of the selected AV data record until all the portions of the selected AV data record have been recorded onto the AVDDM;

wherein the storing, transferring and recording steps are carried out simultaneously for different discrete portions of the selected AV data record; and for each discrete portion of the selected AV data record, the steps (a) to (e) are carried out asynchronously on the basis of the feedback signal.

18. A method according to claim 17, wherein the storing step is carried out sequentially with the recording step and within the time taken to complete the recording step.

19. A method of quickly and securely recording a selected encoded AV (Audio/Video) data record from a first digital data store to an AVDDM (Audio/Video Distributable Data Medium) which enables the AV data record to be read on more than one device, the method comprising the steps of:

(a) reading a discrete portion of the selected AV data record from the first digital data store;

(b) decoding the read discrete portion of the selected AV data record subsequent to the reading step;

(c) storing temporarily the decoded discrete portion of the selected AV data record that has been read from the first digital data store, into a second digital data store;

(d) transferring the read decoded discrete portion from the second digital data store to an AVDDM recorder;

(e) recording the read decoded discrete portion onto the AVDDM;

(f) generating a feedback signal when the AVDDM recorder has finished recording the read discrete portion; and (g) sequentially repeating the steps (a) to (f) for each discrete portion of the selected AV data record until all the portions of the selected AV data record have been recorded onto the AVDDM;

wherein at least the storing and recording steps are carried out simultaneously for different discrete portions of the selected AV data record;

the storing step is carried out sequentially with the recording step and within the time taken to complete the recording step; and for each discrete portion of the selected AV data record, the steps (a) to (e) are carried out asynchronously on the basis of the feedback signal.

20. A method of quickly and securely recording a selected encoded AV (Audio/Video) data record from a first digital data store to an AVDDM (Audio/Video Distributable Data Medium) which enables the AV data record to be read on more than one device, the method comprising the steps of:

(a) reading a discrete portion of the selected AV data record from the first digital data store;

(b) decoding the read discrete portion of the selected AV data record subsequent to the reading step;

(c) storing temporarily the decoded discrete portion of the selected AV data record that has been read from the first digital data store, into a second digital data store;

(d) transferring the read decoded discrete portion from the second digital data store to an AVDDM recorder;

(e) recording the read decoded discrete portion onto the AVDDM; and (f) sequentially repeating the steps (a) to (e) for each discrete portion of the selected AV data record until all the portions of the selected AV data record have been recorded onto the AVDDM;

wherein the storing, transferring and recording steps are carried out simultaneously for different discrete portions of the selected AV data record, and the storing step is carried out sequentially with the recording step and within the time taken to complete the recording step.

21. An apparatus according to claim 15, wherein the apparatus is arranged to operate the second transfer means simultaneously with the first transfer means and the AVDDM recorder for different discrete portions of the selected AV data record.

* * * * *